US007415707B2

(12) United States Patent  (10) Patent No.: US 7,415,707 B2
Taguchi et al.  (45) Date of Patent: Aug. 19, 2008

(54) INSTALLATION SOFTWARE USING A SETTING FILE TO AUTOMATICALLY DETERMINE IF A MODULE IS INSTALLABLE AND THE LOCATION OF THE INSTALLATION

(75) Inventors: Toshihiro Taguchi, Tokyo (JP); Mitsuru Tanabe, Kanagawa (JP); Hirofumi Tamori, Tokyo (JP); Yuka Sakazume, Kanagawa (JP)

(73) Assignee: Sony Corporation, Tokyo (JP)

( * ) Notice: Subject to any disclaimer, the term of this patent is extended or adjusted under 35 U.S.C. 154(b) by 888 days.

(21) Appl. No.: 10/126,809

(22) Filed: Apr. 18, 2002

(65) Prior Publication Data

US 2002/0184499 A1    Dec. 5, 2002

(30) Foreign Application Priority Data

Apr. 19, 2001    (JP)    ............................. 2001-121733

(51) Int. Cl.
*G06F 9/445*    (2006.01)
(52) U.S. Cl. ...................................... 717/174; 717/175
(58) Field of Classification Search ......... 717/168–178; 715/753, 735, 748, 749; 709/202, 220, 223–226, 709/231, 243, 239
See application file for complete search history.

(56) References Cited

U.S. PATENT DOCUMENTS

| 5,247,683 | A | * | 9/1993 | Holmes et al. ............... 709/221 |
| 5,619,716 | A | * | 4/1997 | Nonaka et al. ............... 717/167 |
| 5,793,982 | A | * | 8/1998 | Shrader et al. ............... 709/232 |
| 5,809,251 | A | * | 9/1998 | May et al. .................... 709/223 |
| 5,870,611 | A | * | 2/1999 | London Shrader et al. .. 717/175 |
| 5,881,236 | A | * | 3/1999 | Dickey ....................... 709/221 |
| 6,012,088 | A | * | 1/2000 | Li et al. ....................... 709/219 |
| 6,167,567 | A | * | 12/2000 | Chiles et al. ................ 717/173 |
| 6,199,204 | B1 | * | 3/2001 | Donohue ..................... 717/178 |
| 6,253,368 | B1 | * | 6/2001 | Nelin et al. .................. 717/124 |
| 6,256,773 | B1 | * | 7/2001 | Bowman-Amuah ......... 717/121 |
| 6,282,709 | B1 | * | 8/2001 | Reha et al. ................... 717/175 |
| 6,292,941 | B1 | * | 9/2001 | Jollands ....................... 717/176 |
| 6,301,710 | B1 | * | 10/2001 | Fujiwara ..................... 717/175 |
| 6,366,898 | B2 | * | 4/2002 | Taivalsaari et al. ............. 707/1 |
| 6,408,434 | B1 | * | 6/2002 | Fujiwara ..................... 717/170 |
| 6,434,744 | B1 | * | 8/2002 | Chamberlain et al. ....... 717/168 |
| 6,453,468 | B1 | * | 9/2002 | D'Souza ..................... 717/168 |
| 6,493,871 | B1 | * | 12/2002 | McGuire et al. ............ 717/173 |

(Continued)

OTHER PUBLICATIONS

"Focus On OpenView A Guide to Hewett-Packard's Network and Systems Management Platform", Nathan J. Muller, pp. 1-291, 1995.*

(Continued)

*Primary Examiner*—Todd Ingberg
(74) *Attorney, Agent, or Firm*—Oblon, Spivak, McClelland, Maier & Neustadt, P.C.

(57) ABSTRACT

An information processing apparatus, an information processing method, and a storage medium are disclosed which determines whether or not to install program modules by acquiring environment information relevant to the types of the modules so that only those modules judged compatible with the environment of interest may be installed. This makes it possible for users to install only necessary program modules without becoming aware of specific conditions restricting the installation of the modules.

23 Claims, 27 Drawing Sheets

U.S. PATENT DOCUMENTS

| | | | |
|---|---|---|---|
| 6,539,473 B1 * | 3/2003 | Hubacher et al. | 713/2 |
| 6,553,414 B1 * | 4/2003 | Kakimoto et al. | 709/220 |
| 6,560,776 B1 * | 5/2003 | Breggin et al. | 717/176 |
| 6,675,382 B1 * | 1/2004 | Foster | 717/177 |
| 6,681,392 B1 * | 1/2004 | Henry et al. | 717/176 |
| 6,701,514 B1 * | 3/2004 | Haswell et al. | 717/115 |
| 6,735,625 B1 * | 5/2004 | Ponna | 709/223 |
| 6,742,176 B1 * | 5/2004 | Million et al. | 717/120 |
| 6,751,794 B1 * | 6/2004 | McCaleb et al. | 717/168 |
| 6,754,848 B1 * | 6/2004 | Froehlich et al. | 714/28 |
| 6,754,896 B2 * | 6/2004 | Mishra et al. | 717/176 |
| 6,757,894 B2 * | 6/2004 | Eylon et al. | 717/177 |
| 6,785,706 B1 * | 8/2004 | Horman | 709/203 |
| 6,789,112 B1 * | 9/2004 | Freeman et al. | 709/223 |
| 6,820,259 B1 * | 11/2004 | Kawamata et al. | 717/173 |
| 6,834,269 B1 * | 12/2004 | Bueche | 705/56 |
| 6,836,885 B1 * | 12/2004 | Buswell et al. | 717/172 |
| 6,854,009 B1 * | 2/2005 | Hughes | 709/220 |
| 6,874,143 B1 * | 3/2005 | Murray et al. | 717/173 |
| 6,874,692 B2 * | 4/2005 | Ueda et al. | 236/51 |
| 6,883,168 B1 * | 4/2005 | James et al. | 717/178 |
| 6,922,722 B1 * | 7/2005 | Mann et al. | 709/220 |
| 6,965,928 B1 * | 11/2005 | Cox et al. | 709/220 |
| 6,973,503 B2 * | 12/2005 | Basso et al. | 709/232 |
| 6,985,943 B2 * | 1/2006 | Deryugin et al. | 709/224 |
| 6,990,660 B2 * | 1/2006 | Moshir et al. | 717/171 |
| 6,996,818 B2 * | 2/2006 | Jacobi et al. | 717/170 |
| 7,000,230 B1 * | 2/2006 | Murray et al. | 717/172 |
| 7,062,765 B1 * | 6/2006 | Pitzel et al. | 717/177 |
| 7,069,294 B2 * | 6/2006 | Clough et al. | 709/203 |
| 7,080,051 B1 * | 7/2006 | Crawford | 705/400 |
| 7,080,132 B2 * | 7/2006 | Cheshire | 709/220 |
| 7,096,464 B1 * | 8/2006 | Weinmann | 717/169 |
| 7,140,012 B2 * | 11/2006 | Pugh et al. | 717/170 |
| 7,171,659 B2 * | 1/2007 | Becker et al. | 717/171 |
| 7,171,660 B2 * | 1/2007 | McCaleb et al. | 717/171 |
| 7,185,332 B1 * | 2/2007 | Waldin et al. | 717/170 |
| 7,188,163 B2 * | 3/2007 | Srinivasan et al. | 709/221 |
| 7,249,174 B2 * | 7/2007 | Srinivasa et al. | 709/223 |

OTHER PUBLICATIONS

Installing Mac OS9, Apple, 1999, pp. 1-14.*
"Test Gen Tool version 1.0 User's Guide", Sun MicroSystems, whole document, effective date of May 19, 2001.*

* cited by examiner

FIG.6

SETTING FILE — 152a / 152

| COMMON NAME | Installer |
|---|---|
| APPLICATION TYPE | -1 |
| SUB-APPLICATION TYPE | don't care |
| REMARKS | |
| APPLICATION NAME | Installer |
| LOCATION | http://xxx.com/omginst.new |
| VERSION NUMBER | 0.0.0.2261 |
| SUB-VERSION NUMBER | |
| MUST-INSTALLED FLAG | |

FIG. 7

| CATEGORY | APP TYPE | SUB APP TYPE |
|---|---|---|
| INSTALLER PROPER | −1 | don't care |
| DRIVER PROGRAM | 0 | ami |
| | | cbi |
| | | falcon |
| | | vmc |
| PLUG-IN PROGRAM | 1 | don't care |
| CONTENT MANAGEMENT PROGRAM | 2 | |
| DISPLAY OPERATION PROMPTING PROGRAM | 3 | |

FIG. 19A

```
[OpenMG Installer]
app type = -1
sub app type = 0
app name = OpenMG Installer
repository = http://xxx.coJp/htdocs/omginst.new
version = 0.0.0.2261

[OpenMG Core]
app type = 2
sub app type = 0
app name = OpenMG Core
repository = http://xxx.co.jp/htdocs/OMGCoreInst.exe
version = 2.0.00.01300

[Any Jukebox]
app type = 3
sub app type = 0
app name = don't care
repository = http://xxx.cojp/htdocs/any.exe
version = 1.0.2.340
must = 1
```

FIG. 19B

```
[Any Jukebox]
app type = 3
sub app type = 0
app name = don't care
repository = OpenMG Installer¥Application¥any.exe
version = 1.0.2.340
```

INSTALLATION SOFTWARE USING A SETTING FILE TO AUTOMATICALLY DETERMINE IF A MODULE IS INSTALLABLE AND THE LOCATION OF THE INSTALLATION

BACKGROUND OF THE INVENTION

The present invention relates to an information processing apparatus, an information processing method, and a storage medium. More particularly, the invention relates to an information processing apparatus, an information processing method, and a storage medium each utilizing an installer for the purpose of installing software.

Today's intensifying competition in software development has given rise to the frequent distribution of updated programs with newly added capabilities. Some of these programs are disclosed by their vendors on wide area networks such as the Internet so that users can readily acquire the latest version of the programs in their possession. In such cases, users download the latest software files free of charge or for a fee from a server on the Internet and install the downloaded files into their computers. This allows the users to make use of the updated software as soon as its latest feature are made available.

To install software into a computer requires storing the programs and data constituting the software in question onto a storage medium (e.g., magnetic recording medium) under control of an operating system (OS) while concurrently setting the environment of the OS. Many programs include a dedicated installer program that deals with the complicated steps of setting the environment of the OS upon software installation.

The installer program is a program which, when run by the computer, causes it to establish various settings preparatory to executing the application software in question. When thus run, the installer program specifically causes the computer to copy program and data files to suitable locations on the storage medium as well as to create folders where appropriate on the medium. The installer program also causes the computer to set the environment of the OS. By having the computer run the installer, the user can let the computer take over diverse tasks such as storing the program and setting the operation environment at the same time.

Most software products do not function on a standalone basis; they almost always cooperate with other programs and hardware elements in carrying out their functions. It follows that updating any given software product must be consistent with the functionality of other related programs. Illustratively, an updated OS may leave some application programs inoperable in its new environment. Furthermore, the licensing agreement of some applications does not allow them to be installed under the renewed OS.

Conventionally, checks on the consistency between the cooperative programs often amounted to a burdensome chore that must be done primarily by users. One way to bypass the trouble was by resorting to an installer prompting the computer to install the software in question and to check inter-program consistency. If the consistency was not attained, a warning was issued.

Conventional installers were distributed on the precondition that they be attached to the software they were supposed to install. That meant getting such an installer to verify program consistency required downloading all files constituting the software to be checked. It took time and trouble to do so. If the user was charged for network and telephone connections on an as-used basis, downloading ultimately unusable software added to the loss on the user's part.

The present invention has been made in view of the above circumstances and provides an information processing apparatus, an information processing method, and a storage medium for determining whether or not to permit software installation prior to acquisition of the software in question.

SUMMARY OF THE INVENTION

According to the first aspect of the present invention, there is provided an information processing apparatus including:

location information acquiring means for acquiring, from a predetermined server, location information defining the location of a server which stores at least one program module; and program module acquiring means for acquiring the program module by gaining access to the server storing the program module based on the location information.

According to the second aspect of the present invention, there is provided an information processing apparatus including:

location file acquiring means for acquiring, from a predetermined server, a location file defining the location of a server which stores a setting file including location information defining the location of a server storing at least one program module;

setting file acquiring means for acquiring the setting file by gaining access to the server of which the location is defined by the location file; and program module acquiring means for acquiring the program module by gaining access to the server storing the program module based on the location information.

According to the third aspect of the present invention, there is provided an information processing method including the steps of:

acquiring, from a predetermined server, location information defining the location of a server which stores at least one program module; and acquiring the program module by gaining access to the server storing the program module based on the location information.

According to the fourth aspect of the present invention, there is provided an information processing method including the steps of:

acquiring, from a predetermined server, a location file defining the location of a server which stores a setting file including location information defining the location of a server storing at least one program module;

acquiring the setting file by gaining access to the server of which the location is defined by the location file; and acquiring the program module by gaining access to the server storing the program module based on the location information.

According to the fifth aspect of the present invention, there is provided a storage medium which stores, in a computer-readable manner, a software installation support program for causing a computer to carry out the steps of:

acquiring, from a predetermined server, location information defining the location of a server which stores at least one program module; and acquiring the program module by gaining access to the server storing the program module based on the location information.

According to the sixth aspect of the present invention, there is provided a storage medium which stores, in a computer-readable manner, a software installation support program for causing a computer to carry out the steps of:

acquiring, from a predetermined server, a location file defining the location of a server which stores a setting file including location information defining the location of a server storing at least one program module;

acquiring the setting file by gaining access to the server of which the location is defined by the location file; and acquiring the program module by gaining access to the server storing the program module based on the location information.

According to the seventh aspect of the present invention, there is provided an information processing apparatus including:

location information acquiring means for acquiring, from a predetermined server, location information defining the location of servers which severally store at least one program module; and program module acquiring means for acquiring the program modules by gaining access to the servers severally storing the program modules based on the location information.

According to the eighth aspect of the present invention, there is provided an information processing apparatus including:

location file acquiring means for acquiring, from a predetermined server, a location file defining the location of a sever which stores a setting file including location information defining the location of servers which severally store at least one program module;

setting file acquiring means for acquiring the setting file by gaining access to the server of which the location is defined by the location file;

program module acquiring means for acquiring the program modules by gaining access to the servers storing the program modules based on the location information.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a diagram presenting a typical data structure of a setting file;

FIG. 7 is a table listing a typical classification of modules;

FIG. 19A is a diagram of a setting file described so as to acquire modules via a network;

FIG. 19B is a diagram of a setting file described so as to acquire modules from a CD-ROM;

DETAILED DESCRIPTION OF THE PREFERRED EMBODIMENTS

Preferred embodiments of this invention will now be described with reference to the accompanying drawings.

Figure 1:
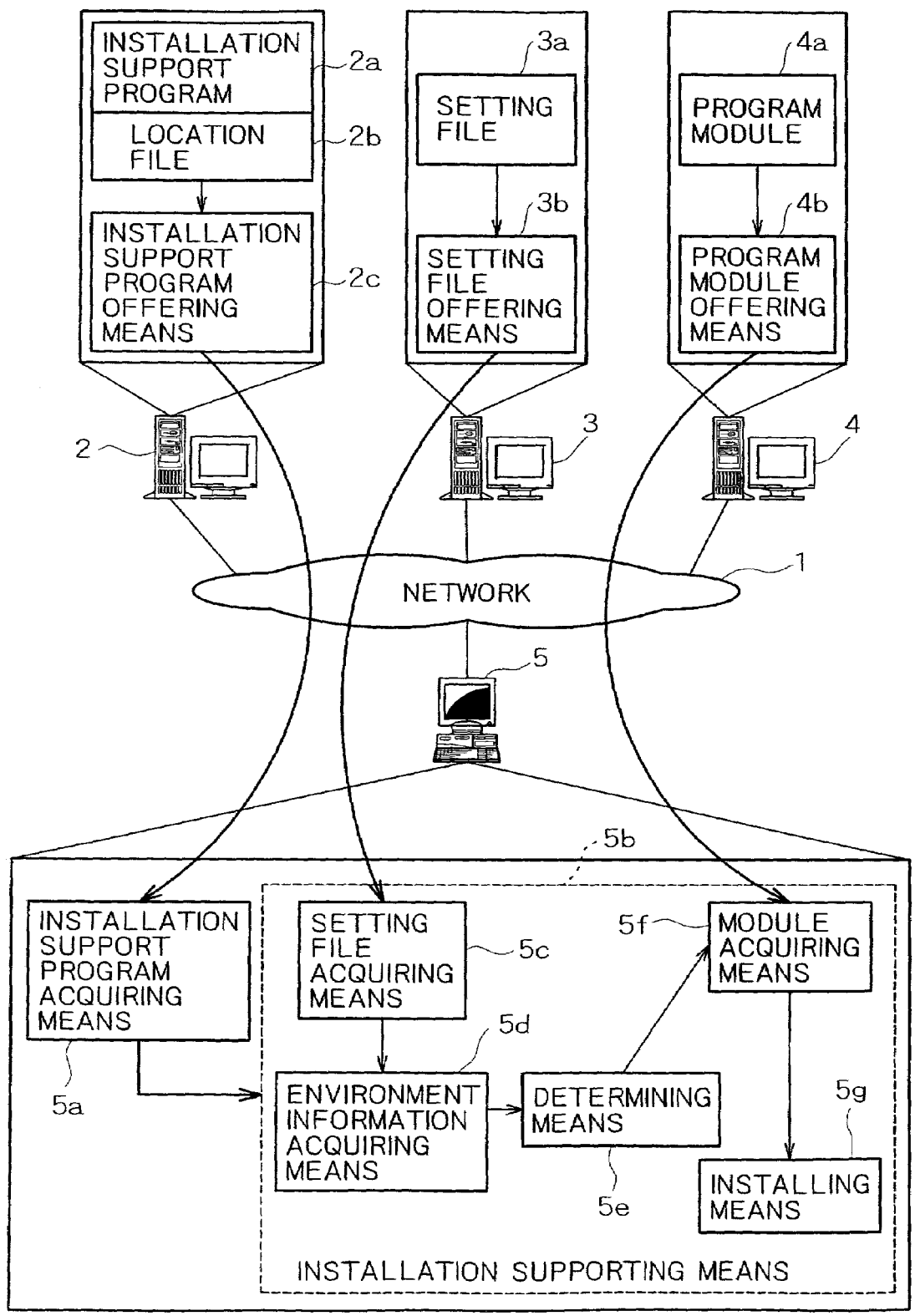
FIG. 1 is a conceptual diagram illustrating the principle underlying the present invention.

FIG. 1 is a conceptual diagram illustrating the principle underlying the present invention. In FIG. 1, an installation support system embodying the invention is shown made up of one or multiple server computers 2, 3, 4 interconnected via a network 1 and of a client computer 5.

The server computer 2 has an installation support program 2a, a location file 2b, and installation support program offering means 2c. The installation support program 2a defines procedures for installing program modules 4a into the client computer 5. The location file 2b defines where a setting file 3a is located. The location file 2b may be contained in the installation support program 2a. The installation support program offering means 2c transmits the installation support program 2a and location file 2b to the client computer 5 in response to the latter's request.

The server computer 3 has the setting file 3a and setting file offering means 3b. The setting file 3a is composed of data including location information and type information. The setting file offering means 3b transmits the setting file 3a to the client computer 5 in response to the latter's request.

The server computer 4 has a program module 4a and program module offering means 4b. The program module 4a is a program that makes up at least part of a given software product The program module offering means 4b transmits the program module 4a to the client computer 5 in response to the latter's request.

The client computer 5 is broadly made up of installation support program acquiring means 5a and installation supporting means 5b. The installation support program acquiring means 5a transmits acquisition requests to the server computer 2 to acquire the installation support program 2a and location file 2b from the server computer 2.

The installation supporting means 5b is a processing function implemented by the client computer 5 executing the installation support program 2a. The installation supporting means 5b includes setting file acquiring means 5c, environment information acquiring means 5d, determining means 5e, module acquiring means 5f, and installing means 5g.

The setting file acquiring means 5c transmits a setting file acquisition request to the server computer 3 to acquire the setting from 3a from the latter. The setting file acquiring means 5c hands the acquired setting file 3a over to the environment information acquiring means 5d.

Given the setting file 3a, the environment information acquiring means 5d carries out environment analysis to acquire environment information. The environment information illustratively includes the type of the OS and version information about program modules which have already been installed and which belong to the same family as the program module to be acquired The environment information acquiring means 5d transfers the acquired environment information to the determining means 5e.

The determining means 5e determines the type of the program module 4a in reference to the setting file 3a acquired by the setting file acquiring means 5c Then the determining means 5e determines whether or not to permit installation of the program module 4a based on the type of the program module 4a and on the environment information acquired by the environment information acquiring means 5d.

When the installation of the program module 4a is permitted by the determining means 5e, the module acquiring means 5f transmits a program module acquisition request to the server computer 4 over the network 1 on the basis of the location information in the setting file 3a acquired by the setting file acquiring means 5c, and receives the program module 4a from the server computer 4. The module acquiring means 5f hands the received program module 4a over to the installing means 5g.

The installing means 5g installs the program module 4a into the client computer 5.

The installation support system of the above constitution thus causes the installation support program acquiring means 5a to acquire the installation support program 2a and location file 2b in order to execute the installation support program 2a and thereby to start the installation supporting means 5b. The location file 2b reveals where the setting file 3a is located, allowing the setting file acquiring means 5c to acquire the setting file 3a.

The environment information acquiring means 5d acquires the environment information relevant to the setting file 3a and hands the acquired information over to the determining means 5e. In turn, the determining means 5e determines whether or not to permit installation of the program module 4a. If the installation of the program module 4a is permitted, the module acquiring means 5f acquires the program module 4a that is installed into the client computer 5 by the installing means 5g.

Once the installation support program 2a is downloaded to the client computer 5, the setting file 3a need only be downloaded thereafter to let the client computer 5 determine whether or not to permit installation of the program module 4a. As a result, the user at the client computer 5 need not worry about whether or not to install the program module 4a anew. This will appreciably reduce the burdens on the user.

Only the setting file 3a needs to be downloaded; there is no need to download unnecessary program modules. With the download of superfluous programs thus forestalled, processing is made more efficient. Where the user is charged for network connections on an as-used basis, the user can be spared extra expenditures.

In the setup of FIG. 1, the installation support program 2a, location file 2b, setting file 3a, and program module 4a are stored in distributed fashion by the three server computers 2, 3, 4. Alternatively, the programs and files may be contained in a single server computer. As another alternative, the installation support program 2a, location file 2b, setting file 3a, and program module 4a may be recorded on a storage medium such as a CD-ROM (compact disk read-only memory) to be offered to the client computer 5.

The above-described installation support system according to the invention may be applied to the installation of diverse kinds of software. The inventive system is particularly advantageous when used to install into the client computer 5 a plurality of software products (i.e., program modules) developed independently by a plurality of companies. Where program modules have been developed by multiple firms, it is generally difficult for users to verify the latest versions of these products for consistency as needed. If the user's operation environment is altered illustratively by an update of the OS, it takes a lot of time and trouble for the user to check the compatibility of each of the program modules through inquiries to the individual vendors involved. The inventive system allows the user to update with a minimum of effort only those program modules consistent with the current environment of the client computer.

An example in which a plurality of cooperative program modules are developed by different companies is a music data distribution system designed to protect copyrights. For such a system, a plurality of program modules designed to protect copyrights may be integrated while multiple vendors are allowed separately to develop their own user interfaces through which users acquire or copy music data.

Hereunder, the invention may be embodied illustratively as a music data distribution system for distributing music data over a network while protecting copyrights. An example of the technology adopted for copyright protection is OpenMG (registered trademark) offered by Sony Corporation. This embodiment offers separately a content management program for music data copyright protection and a display operation prompting program acting as an interface for managing music data. The content management program and display operation prompting program are each constituted by a plurality of program modules.

In the description that follows, the program modules may be simply called the modules and the server computers as the servers.

Figure 2:
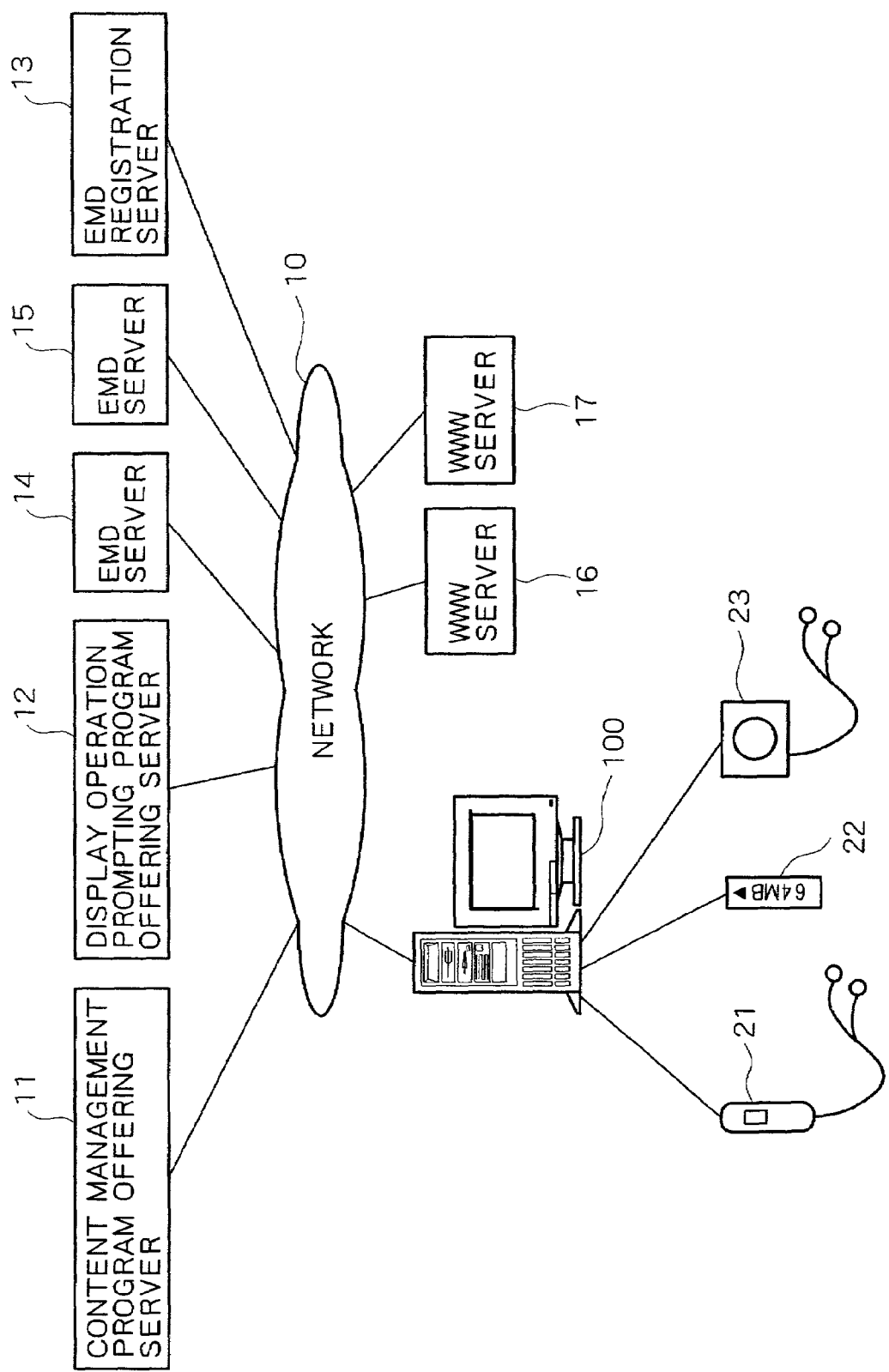
FIG. 2 is a diagram showing a typical configuration of an installation support system embodying the invention.

FIG. 2 is a diagram showing a typical configuration of an installation support system embodying the invention. As shown in FIG. 2, a computer 100 is connected to a network 10 constituted by a local area network or by the Internet. In accordance with an installation support program downloaded from a content management program offering server 11, the computer 100 downloads modules constituting a content management program and a display operation prompting program from the content management program offering server 11 and a display operation prompting program offering server 12. Also using the installation support program, the computer 100 installs into its system the downloaded programs or those stored on a storage medium such as a CD (compact disk). In addition, the computer 100 compresses, by a predetermined compression method (e.g., ATRAC3 (registered trademark)), music data (called the contents hereunder) that are either received from EMD (electronic music distribution) servers 14, 15 or retrieved from CDs (to be described later), and encrypts the contents illustratively by DES (Data Encryption Standard) for recording purposes.

In conjunction with the contents thus encrypted and stored, the computer 100 records use condition data denoting use conditions imposed on the corresponding contents. The use condition data may illustratively specify the number of portable devices (PDs, to be described later) that may simultaneously utilize the content corresponding to a given use condition. When a given content is checked out as many times as a content check-out count (to be described later) denoted by the use condition data, the computer 100 may still reproduce the checked-out content.

Alternatively, the use condition data may indicate the availability of contents to be copied. When a content is copied to portable devices 21 through 23, the computer 100 may reproduce the recorded content. Constraints may be imposed on the number of times any content is stored into the portable devices 21 through 23. In that case, the capped copy count cannot be increased.

The use condition data may alternatively designate conditions under which contents may be moved from one computer to another. For example, after a content is moved into the portable devices 21 through 23, that content stored in the computer 100 may no longer be available (either the content is erased or its use conditions are changed so that the content becomes unavailable).

The computer 100 may move an encrypted and recorded content along with its related data (e.g., music titles or playback conditions) for storage into the portable device 21 connected through a USB (Universal Serial Bus) cable. In keeping with the storing operation into the portable device 21, the computer 100 updates the use condition data corresponding to the stored content (the update operation is called the check-out). More specifically, whenever any content stored in the computer 100 is checked out, a check-out count for the content in question (i.e., the maximum number of times the content may be checked out) is decremented by 1. When the checkout count has reached zero, the corresponding content can no longer be checked out.

The computer 100 may also move the encrypted and recorded content along with its related data for storage into the portable device 22 inserted into a memory reader/writer in the computer 100. In keeping with the storing operation into the portable device 22, the computer 100 updates the use condition data corresponding to the stored content. The computer 100 may further move the encrypted and recorded content along with its related data for storage into the portable device 23 connected through a USB cable. In keeping with the storing operation into the portable device 23, the computer 100 updates the use condition data corresponding to the stored content.

At other times, the computer 100 may cause the portable device 21 to delete (or render unusable) the content checked out to the latter by the computer 100 and update simultaneously the use condition data corresponding to the deleted content (the update operation is called the check-in). More specifically, whenever any content is checked in, the computer 100 increments by 1 the check-out count in the use condition corresponding to the checked-in content.

When the computer 100 causes the portable device 22 to delete (or render unusable) the content checked out to the latter, the computer 100 updates the use condition data corresponding to the deleted content. Likewise, when causing the portable device 23 to delete (or render unusable) the content checked out to the device, the computer 100 updates the use condition data applicable to the deleted data.

It should be noted that the computer 100 cannot check in the content that was checked out by another computer, not shown, to the portable device 21. Similarly, the computer 100 may not check in the content that was checked out by another computer to the portable device 22; the computer 100 cannot likewise check in the content that was checked out by another computer to the portable device 23.

The content management program offering server 11 retains the content management program, setting file, and installation support program. The content management program is made up of a plurality of modules. The setting file contains management information such as version numbers of the modules making up the content management program as well as version numbers of various modules for causing the computer to execute processes in cooperation with the content management program. The setting file is stored in encrypted form in the content management program offering server 11.

The installation support program includes a location file indicating where the setting file is located (i.e., repository to which computers on the network gain access). The location file is registered in encrypted form in the installation support program.

The content management program offering server 11 transmits a content management program installer to the computer 100 in response to an installation support program acquisition request sent from the computer 100 over the network 10. The content management program offering server 11 also transmits the content management program in response to a request from the computer 100 sent over the network 10. In the content management program acquisition request, the program to be acquired may be specified in units of modules. In other words, the content management program offering server 11 transmits to the computer 100 only those modules of the content management program which are designated in the content management program acquisition request.

The display operation prompting program offering server 12 retains the display operation prompting program. This is a program that provides user interfaces through which users manage music data by means of the computer 100. The display operation prompting program is constituted by one or multiple modules. In response to a request from the computer 100 sent over the network 10, the display operation prompting program offering server 11 transmits the display operation prompting program to the requesting computer 100.

When the computer 100 starts acquiring contents from EMD servers 14, 15, an EMD registration server 13 transmits to the computer 100, in response to a request from the computer 100, an authentication key necessary for two-way authentication between the computer 100 and the EMD servers 14, 15. After the authentication, the EMD registration server 13 transmits to the computer 100 a program for connecting to the EMD servers 14, 15.

The EMD server 14 supplies the content and its related data (e.g., music title or restrictions on playback) to the computer 100 over the network 10 in response to a request from the computer 100. The EMD server 15 also supplies the content and its related data through the network 10 to the computer 100 in response to the latter's request.

The content to be supplied by the EMD servers 14, 15 are compressed by the same or different compression methods, and are encrypted by the same or different encryption standards.

A WWW (World Wide Web) server 16 supplies the content read from a CD (e.g., CD album name or CD vendor name) and content-related data (e.g., music titles or composer names) to the computer 100 over the network 10 in response to a request from the computer 100. A WWW server 17 also supplies the content read from a CD and content-related data to the computer 100 over the network 10 in response to a request from the computer 100.

The portable device 21 stores the content fed from the computer 100 (i.e., checked-out content) along with the content-related data (e.g., music titles or restrictions on playback). Based on the content-related data, the portable device 21 reproduces the stored content for output illustratively to headphones.

For example, if an allowable playback count is stored as a restriction on playback in the content-related data, the portable device 21 denies any attempt to reproduce the content of interest in excess of that count. If a playback time limit is stored as a restriction on playback in the content-related data, the portable device 21 denies any attempt to reproduce the content in question past that time limit.

The user may detach from the computer 100 the portable device 21 retaining the contents, carry the device around and play back the relevant stored contents such as music data illustratively through headphones.

The portable device 22 is illustratively a semiconductor memory with technical capabilities of accommodating encrypted contents. An example of the technology for storing encrypted contents is so-called MG (Magic Gate) The portable device 22 stores the content fed from the computer 100 together with the content-related data. When inserted into a sound source player (e.g., headphone stereo), not shown, the portable device 22 lets the player reproduce the stored content in accordance with the content-related data for output illustratively to headphones. The user may detach from the computer 100 the portable device 22 retaining the content, carry the device around, and have the stored content reproduced by a suitable sound source player to enjoy the relevant stored content such as music data illustratively through headphones.

The portable device 23 stores the content fed from the computer 100 along with the content-related data. The portable device 23 reproduces the stored content in keeping with the content-related data for output illustratively to headphones. The user may detach from the computer 100 the portable device 23 retaining the content, carry the device around, and get the device to reproduce the stored content so as to enjoy the relevant stored content such as music data illustratively through headphones.

In the description that follows, the portable devices 21 through 23 are represented generically by the portable device 21 where there is no need to distinguish the devices individually.

Figure 3:
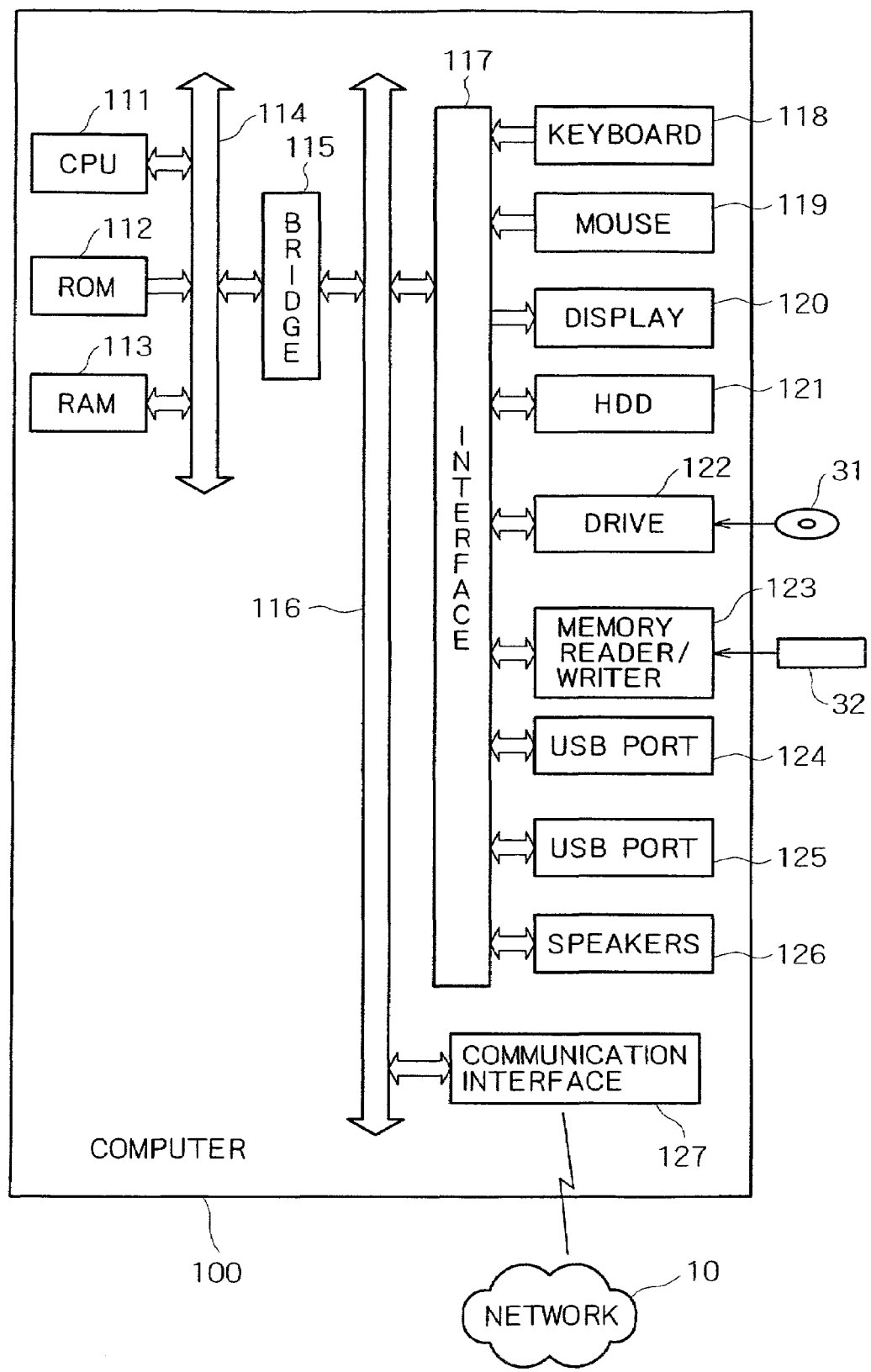
FIG. 3 is a block diagram depicting a typical structure of a computer.

FIG. 3 is a block diagram depicting a typical structure of the computer 100. A CPU (central processing unit) 111 runs the OS and various application programs (e.g., installer programs). A ROM (read-only memory) 112 generally accommodates basically fixed data as part of programs and operation parameters used by the CPU 111. A RAM (random-access memory) 113 stores programs executed by the CPU 111 and parameters varied as needed during the program execution. The CPU 111, ROM 112 and RAM 113 are interconnected by a host bus 114 constituted illustratively by a CPU bus.

The host bus 114 is connected via a bridge 115 to an external bus 116 such as a PCI (Peripheral Component Interconnect/Interface) bus.

A keyboard 118 is operated by the user to enter various commands into the CPU 111. A mouse 119 is manipulated by the user to select or point to what is being displayed on a display 120. The display 120 may illustratively be a liquid crystal display or a CRT (cathode ray tube) that allows diverse kinds of information to appear in text or as images. A hard disk drive (HDD) 121 drives hard disks to and from which programs and data are written and read for execution by the CPU 111.

A drive 122 may be loaded with an optical disk 31. The optical disk 31 may be a DVD (digital versatile disk), a DVD-RAM (random access memory), a CD-ROM, a CD-R (recordable)/RW (rewritable), or a music CD. The drive 122 reads data or programs from the loaded optical disk 31 and feeds the retrieved data or programs to the RAM 113 that is connected through an interface 117, the external bus 116, the bridge 115, and the host bus 114.

A memory reader/writer 123 may be loaded with a semiconductor memory 32 such as the portable device 22. The memory reader/writer 123 reads data or programs from the loaded semiconductor memory 32 and supplies the retrieved data or programs to the RAM 113 connected via the interface 117, external bus 116, bridge 115, and host bus 114.

A USB (Universal Serial Bus) port 124 is connected illustratively with the portable device 21 through a suitable cable. The USB port 124 outputs to the portable device 21 the data (e.g., those including contents or commands to the portable device 21) fed from the hard disk drive 121, CPU 111 or RAM 113 through the interface 117, external bus 116, bridge 115 or host bus 114.

A USB port 125 is connected illustratively with the portable device 23 through a suitable cable. The USB port 125 outputs to the portable device 23 the data (e.g., those including contents or commands to the portable device 23) fed from the hard disk drive 121, CPU 111 or RAM 113 through the interface 117, external bus 116, bridge 115 or host bus 114.

Speakers 126 output sound relevant to the content of interest based on the data or sound signals fed from the interface 117.

The keyboard 118, mouse 119, display 120, hard disk drive 121, drive 122, memory reader/writer 123, USB port 124 and 125, and speakers 126 are connected to the interface 117. In turn, the interface 117 is connected to the CPU 111 through the external bus 116, bridge 115, and host bus 114.

A communication interface 127 is connected to the network 10 and transmits data in packets over the network 10, the data having being fed from the CPU 111 or from the hard disk drive 121 (e.g., registration request or content transmission request) and packetized by a predetermined method. Furthermore, the communication interface 127 outputs, through the network 10, to the CPU 111, RAM 113 or hard disk drive 121 the packetized data (e.g., authentication key, contents, etc.).

The communication interface 127 connects to the CPU 111 through the external bus 116, bridge 115, and host bus 114.

When the computer 100 of the above-described hardware structure carries out the programs stored on the hard disk drive 121, the features specific to the invention are implemented by the computer 100.

Figure 4:
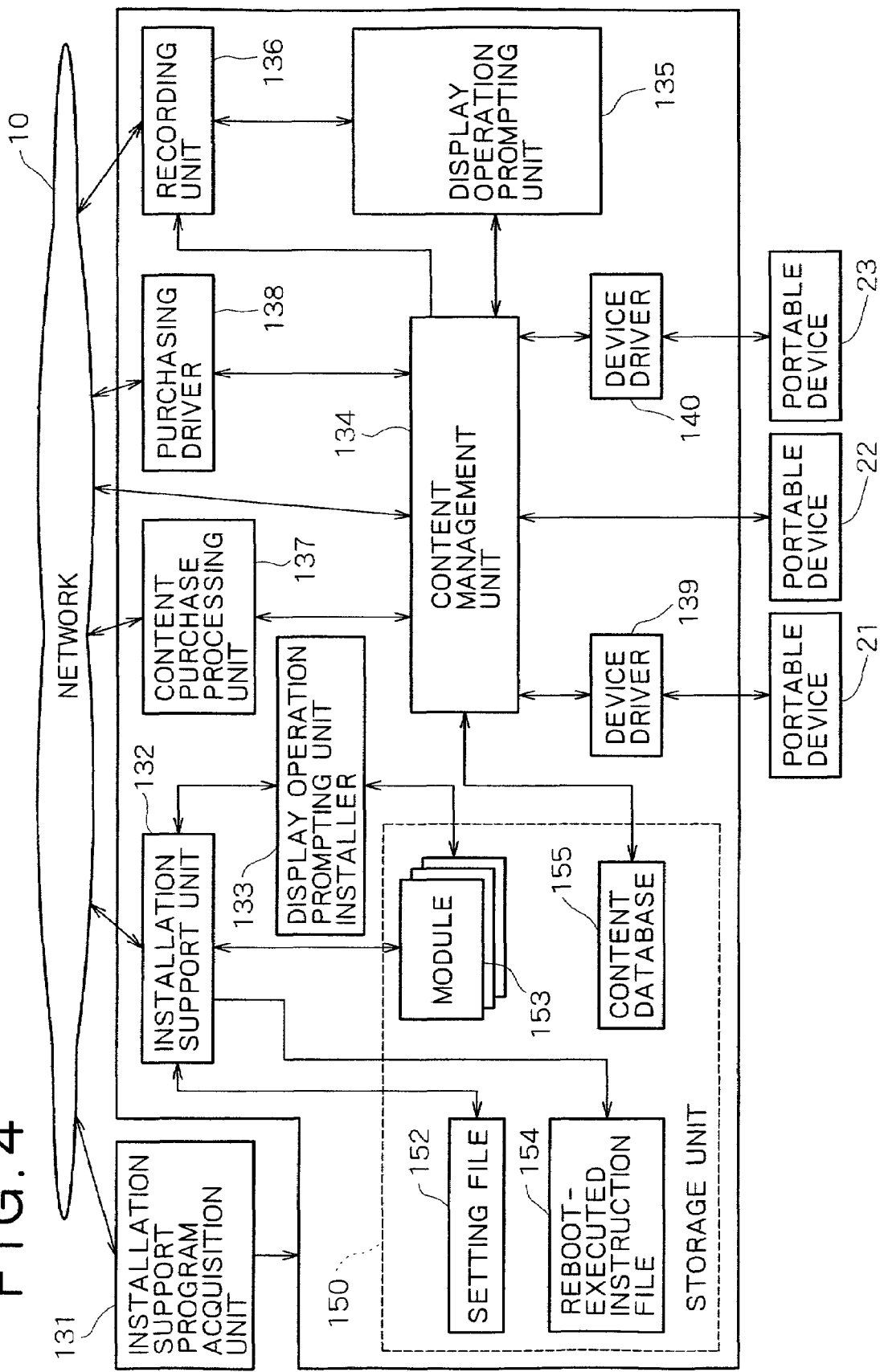
FIG. 4 is a block diagram indicating a typical functional structure implemented by the computer.

FIG. 4 is a block diagram indicating a typical functional structure provided by the computer 100. The functions shown in FIG. 4 are implemented specifically by the CPU 111 executing the relevant programs. The functions of the OS controlling the computer 100 as a whole are omitted from FIG. 4. It should be noted that the OS of the computer 100 has the ability to carry out instructions described in a reboot-executed instruction file 154, in addition to the usual capabilities of the OS such as file management functions for the hard disk drive 121 and memory management functions for the RAM 113.

Of the component functions shown in FIG. 4, those except for the functions of an installation support program acquisition unit 131 and a storage unit 150 are implemented by the computer 100 executing relevant modules 153 installed. Illustratively, the function of a content management unit 134 is implemented by the computer 100 carrying out the modules constituting the content management program. Likewise, the function of a display operation prompting unit 135 is implemented by the computer 100 executing the modules making up the display operation prompting program.

As described, the computer 100 implements the functions of the installation support program acquisition unit 131, an installation support unit 132, content management unit 134, and display operation prompting unit 135, as well as the functions of a recording unit 136, a content purchase processing unit 137, a purchasing driver 138, and device drivers 139, 140.

The installation support program acquisition unit 131 has the ability to communicate with the content management program offering server 11 through the network 10. In response to the user's input operation through the keyboard 118 or mouse 119, the installation support program acquisition unit 131 acquires the installation support program from the content management program offering server 11.

Illustratively, where the installation support program is to be acquired through the network 10, the installation support program acquisition unit 131 first transmits an installation support program acquisition request to the content management program offering server 11 and downloads the installation support program in return. The installation support program acquisition unit 131 stores the downloaded installation support program into the storage unit 150.

The installation support program acquisition unit 131 may alternatively acquire the installation support program from the optical disk 31 loaded in the drive 122 in response to the input operation by the user through the keyboard 118 or mouse 119. If the installation support program is to be acquired from the optical disk 31 such as a CD-ROM, the installation support program 131 first gains access to the optical disk 31 through the drive 122 and retrieves the installation support program from the optical disk 31. The installation support program 131 stores the retrieved installation support program into the storage unit 150.

The function of the installation support unit 132 is implemented by the computer 100 executing the installation support program acquired by the installation support program acquisition unit 131. Other functions are then carried out by the installation support unit 132 when the unit is activated.

The installation support unit 132 performs processing to get the content management program installed into the computer 100. The installation support unit 132 is started by the computer 100 executing the installation support program acquired by the installation support program acquisition unit 131.

More specifically, the installation support unit 132 references the contents of the location file in response to the user's input operation through the keyboard 118 or mouse 119 and acquires a setting file 152 from the location indicated by the location file. Where the setting file 152 is to be acquired over the network 10, the installation support unit 132 transmits a setting file acquisition request to the content management program offering server 11 and downloads the setting file 152 in return. If the setting file 152 is to be acquired from the optical disk 31, the installation support unit 132 accesses the optical disk 31 via the drive 122 and reads out the setting file 152 from the optical disk 31. Where to acquire the setting file 152 is determined by referring to the location file (included in the installation support program). The installation support unit 132 stores the setting file 152 thus acquired into the storage unit 150.

The installation support unit 132 compares the contents of the setting file 152 (i.e., latest version numbers of the modules involved) with the operation environment of the computer 100 (version numbers of the modules already installed), and creates a list of the modules to be installed (installable module list) accordingly. The installation support unit 132 causes the display 120 to display the installable module list thus created so that the user viewing the list may select modules to be installed.

The installation support unit 132 acquires modules for reproducing or managing music data in response to the user's input operation through the keyboard 118 or mouse 119. Where the modules 153 are to be acquired via the network 10, the installation support unit 132 transmits a module acquisition request to the content management program offering server 11 and display operation prompting program offering server 12, and downloads the relevant modules therefrom. If the modules 153 are to be acquired from the optical disk 31, the installation support unit 132 accesses the optical disk 31 through the drive 122 and reads out the modules 153 from the optical disk 31. The installation support unit 132 stores the downloaded or retrieved modules 153 into the storage unit 150 before installing the modules into the computer 100.

Some modules 153 may include a dedicated installer. Where a module 153 having a dedicated installer is to be installed, the installation support unit 132 first starts the dedicated installer which in turn installs the module in question.

Other modules 153 may include the modules of the most recent versions constituting the installation support program. In that case, the installation support unit 132 writes to a reboot-executed instruction file 154 an instruction for installing the latest modules of the installation support program.

The content management unit 134 is a function implemented when those of the installed modules 153 which are designed for content management are started. The content management modules are illustratively described in the form of shuffled or encrypted instructions so that their processes are hidden from the outside and shielded against interpretation (e.g., so that the instructions cannot be identified even if the user reads out the content management unit 134). Details of the content management unit 134 will be discussed later.

The display operation prompting unit 135 causes a content list to appear on the display 120, accepts content processing requests made by the user through the keyboard 118 or mouse 119, and forwards the processing requests to the content management unit 134. The display operation prompting unit 135 is commonly called "Jukebox."

During content registration processing, the display operation prompting unit 135 transmits a previously stored ID of the content management unit 134 to the EMD registration server 13 over the network 10, receives an authentication key and an EMD selection unit 134a from the EMD registration server 13, and supplies the received authentication key and EMD selection unit 134a to the content management unit 134. Details of the display operation prompting unit 135 will be discussed later.

The recording unit 136 causes a predetermined window image to appear and, based on the operations made through the keyboard 118 or mouse 119, retrieves data such as recording times of contents from the optical disk 31 (i.e., CD) loaded in the drive 122.

In keeping with the recording times of contents read from the CD, the recording unit 136 requests the WWW server 16 or 17 over the network 10 to transmit the data corresponding to the CD (e.g., album name or artist name) or the data relevant to the contents recorded on the CD (e.g., music titles). The recording unit 136 thus receives from the WWW server 16 or 17 the data corresponding to the CD or relevant to the contents recorded on the CD.

The recording unit 136 supplies the display operation prompting unit 135 with the received data which correspond to the CD or are relevant to the contents recorded on the CD.

Furthermore, upon input of a recording command, the recording unit 136 reads out the contents from the optical disk 31 (CD) loaded in the drive 122 and outputs the retrieved contents to the content management unit 134.

The content purchase processing unit 137 requests the EMD server 14 over the network 10 to transmit relevant contents while receiving contents from the EMD server 15. Upon receipt of the contents from the EMD server 15, the purchasing driver 138 carries out charge processing.

The purchasing driver 138 is a function implemented by use of what is known as a plug-in program (module). The module of the purchasing driver 138 is installed together with the modules of the content management unit 134; that module is either supplied from the EMD registration server 13 over the network 10 or read from a suitable CD. When installed in the computer 100, the purchasing driver 138 sends and receives data to and from the content management unit 134 through an appropriate interface furnished by the content management unit 134.

The purchasing driver 138 requests the EMD server 15 over the network 10 to transmit predetermined contents and receives the requested contents from the EMD server 15. Upon receipt of the contents from the EMD server 15, the purchasing driver 138 carries out charge processing.

In response to requests from the content management unit 134, the device driver 139 sends processing requests and data to the portable device 21. In addition, the device driver 139 receives data from the portable device 21 and hands the received data over to the content management unit 134.

The device driver 140 transmits processing requests and data to the portable device 23 in response to requests from the content management unit 134. Furthermore, the device driver 140 receives data from the portable device 23 and hands the received data over to the content management unit 134.

The storage unit 150 is constituted by storage regions of the RAM 113 and hard disk drive 121. As such, the storage unit 150 accommodates the setting file 152, multiple modules 153, reboot-executed instruction file 154, and a content database 155. The setting file 152 stored in encrypted form in the content management program offering server 11 is placed into the RAM 113 after being decrypted but will not be stored onto the hard disk drive 121 once decrypted. The reboot-executed instruction file 154 contains the instructions that are executed only once by the computer 100 next time the OS is rebooted. After carrying out all instructions in the reboot-executed instruction file 154, the computer 100 deletes the contents of the reboot-executed instruction file 154.

Figure 5:
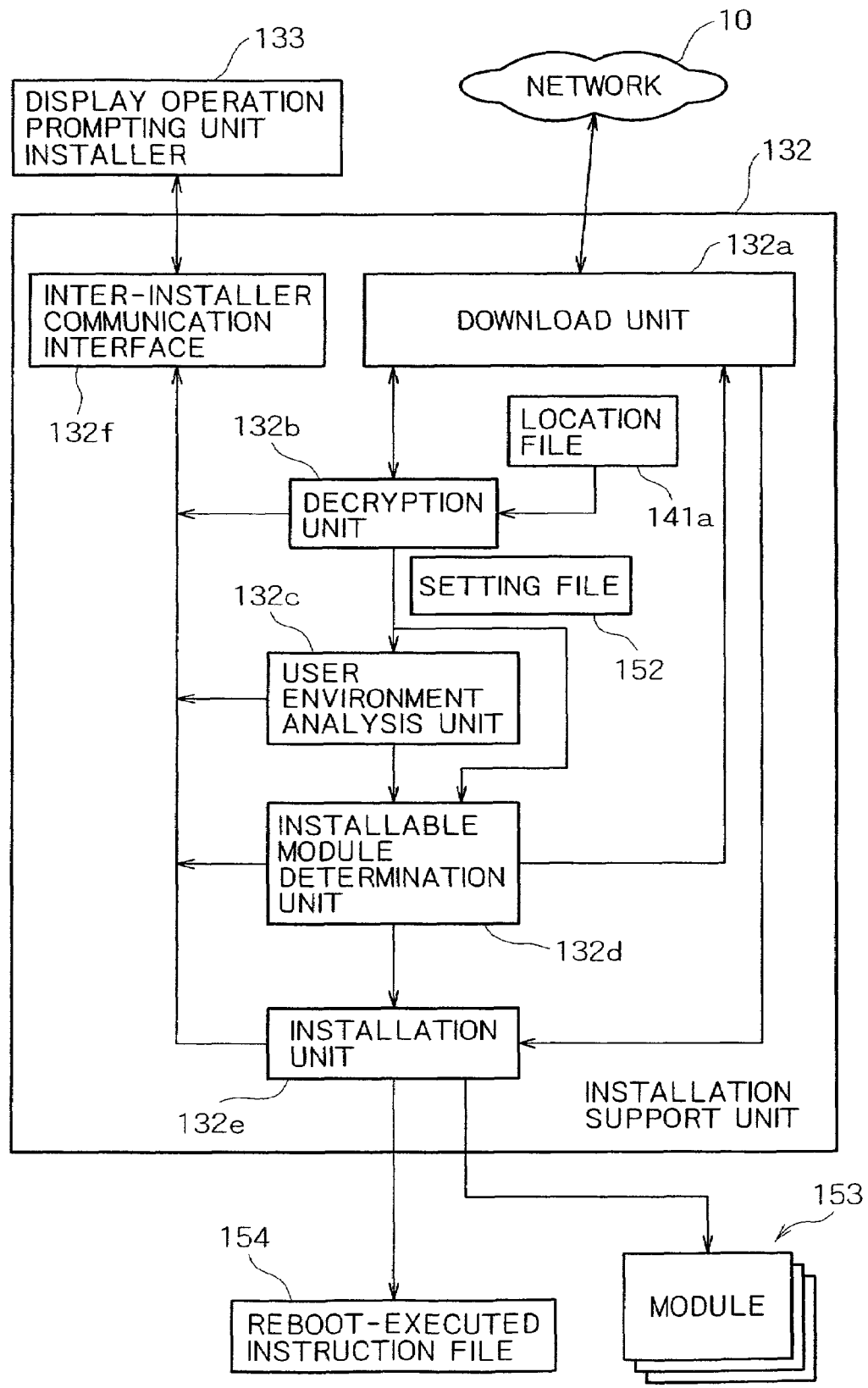
FIG. 5 is a block diagram sketching a typical functional structure of an installer.

FIG. 5 is a block diagram sketching a typical functional structure of the installation support unit 132. The installation support unit 132 is made up of a download unit 132a, a decryption unit 132b, a user environment analysis unit 132c, an installable module determination unit 132d, an installation unit 132e, and an inter-installer communication interface 132f.

The decryption unit 132b decrypts a location file 141a that is included in encrypted form in the installation support program. After the decryption, the decryption unit 132b transfers to the download unit 132a information indicating the location of the setting file 152 which is recorded in the location file 141a.

Upon receipt of the setting file 152 in encrypted form from the download unit 132a, the decryption unit 132b decrypts the received setting file 152. The decryption unit 132b hands the decrypted setting file 152 over to the user environment analysis unit 132c and installable module determination unit 132d.

When receiving information denoting the location of the setting file 152 from the decryption unit 132b, the download unit 132a gains access to the content management program offering server 11 over the network 10 and downloads the setting file 152 from the content management program offering server 11.

On receiving location information (i.e., about where the modules to be downloaded are located) from the installable module determination unit 132d, the download unit 132a downloads the relevant modules accordingly from the content management program offering server 11 and display operation prompting program offering server 12. The download unit 132a then hands the downloaded modules over to the installation unit 132e.

The user environment analysis unit 132c analyzes the contents of the setting file 152 received from the decryption unit 132b in order to determine whether or not the computer 100 contains previously installed programs whose information such as version number information is defined in the setting file 152. If the computer 100 is judged to have such programs installed therein, the user environment analysis unit 132c checks the version numbers of these programs. Thereafter the user environment analysis unit 132c transfers to the installable module determination unit 132d the version number information about the programs already installed in the computer 100.

The installable module determination unit 132d creates an installable program list based on the setting file 152 from the decryption unit 132b as well as on the version number information about the programs sent from the user environment analysis unit 132c. More specifically, the installable module determination unit 132d compares the version numbers of the programs defined in the setting file 152 with the version numbers from the user environment analysis unit 132c of the programs already installed in the computer 100. If the comparison reveals any program that is later in version than its existing counterpart, the installable module determination unit 132d adds information about that program to the installable program list.

Furthermore, the installable module determination unit 132d causes the contents of the created installable program list to appear on the display 120 so that the user viewing the list may be able to select the programs to be installed. When the target programs to be installed are selected by the user's input operation, the installable module determination unit 132d transfers to the download unit 132a information about the selected programs.

Upon receipt of modules from the download unit 132a, the installation unit 132e installs the received modules into the computer 100. The modules thus installed are stored into the storage unit 150 as the modules 153 executable by the computer 100.

When installing the installation support program of an updated version, the installation unit 132e inserts into the reboot-executed instruction file 154 necessary instructions for installing the updated installation support program.

If the modules to be installed are those constituting the display operation prompting program, the installation unit 132e requests the inter-installer communication interface 132f to start a display operation prompting unit installer 133.

The inter-installer communication interface 132f communicates with the display operation prompting unit installer 133. More specifically, the inter-installer communication interface 132f causes the installation support unit 132 to start installing the modules in response to a starting request from the display operation prompting unit installer 133. Responding to a request from the installation unit 132e, the inter-installer communication interface 132f activates the requested display operation prompting unit installer 133.

In addition, the inter-installer communication interface 132f receives information about processing status from the other components of the installation support unit 132 (download unit 132a, decryption unit 132b, user environment analysis unit 132c, installable module determination unit 132d, and installation unit 132e), and hands the received information over to the display operation prompting unit installer 133.

FIG. 6 is a diagram presenting a typical data structure of the setting file 152. The setting file 152 contains module information 152a about each of the modules registered in the content management program offering server 11 and display operation prompting program offering server 12. The module information 152a includes a common name, an application type, a sub-application type, remarks, an application name, a location, a version number, a sub-version number, and a must-installed flag about the module in question.

The common name is a name commonly attributed to the module of interest, such as an "Installer" or "Any Jukebox." The "Installer" is a common name of the installation support program, and "Any Jukebox" is a common name attributed to the display operation prompting program.

The application type is an identifier identifying the type of the module. The application type designates different ways the module in question is handled by the user environment analysis unit 132c, installable module determination unit 132d, and installation unit 132e. Illustratively, the user environment analysis unit 132c determines how to acquire the version number information about the existing program depending on the application type. Where the application type indicates an "Installer" (installation support program), the installable module determination unit 132d always regards the latest version of the corresponding module as the module to be installed.

If the application type indicates "Installer," then the installation unit 132e edits the reboot-executed instruction file 154; if the application type denotes a display operation prompting program installer, the installation unit 132e starts the corresponding display operation prompting unit installer 133; if the application type indicates any other type, the installation unit 132e installs the applicable module.

The sub-application type provides information for allowing the module in question to be classified into a more detailed category.

The remarks carry information that is specifically needed for installing the module in question.

The application name denotes a proper name given to the module.

The location provides location information defining where the module in question is located. If the module is retained in the display operation prompting program offering server 12, then a URL (Uniform Resource Locator) of the module is furnished by the location information. Where the module is offered on a storage medium such as a CD, the location information denotes a relative path from the location where the installation support program is recorded, to the location where the module is recorded (i.e., relative locational relationship in the directory structure).

The version number indicates information about the version number of the module stored in the designated module location.

The sub-version number is information which denotes the best-suited version number of the module to be installed depending on the different environment of the computer 100. Where the sub-version number is provided, the designated module location accommodates a module that integrates a plurality of versions. The sub-version number is described in a format such as "version2000=0.0.0.2263" (the value 2000 indicates the type of the OS), which identifies the version number of the OS (or type of the OS) under which to install the module in question.

The must-installed flag is a flag that indicates whether or not installation of the module is indispensable. Illustratively, the module must always be installed if the must-installed flag is set to "1," and may or may not be installed if the flag is set to "0." The module whose installation is mandatory cannot be left out discretionally by the user's input operation.

FIG. 7 is a table listing a typical classification of each module. With this embodiment, the modules are classified into the application type and sub-application type. In the example of FIG. 7, the application type indicating an installer proper is set for "−1," the application type indicating a driver program is set for "0," the application type indicating a plug-in program is set for "1," the application type indicating a content management program is set for "2," and the application type indicating a display operation prompting program is set for "3."

The sub-application type for the installer proper is "don't care." As its wording implies, this sub-application type has no meaning. The sub-application types for the driver program are "ami," "cbi," "falcon" and "vmc." These sub-application types are identifiers that identify the specifications of drivers and the types of the devices to be controlled.

In this example, the sub-application type determines under which OS each driver program can be installed in consideration of the licensing agreement in effect. The installation support program may be arranged to contain information defined such as to designate corresponding relations between each driver program on the one hand, and the type and version number of the OS under which the driver program in question can be installed on the other hand.

The sub-application types for the plug-in program, content management program, and display operation prompting program are "don't care."

Figure 8:
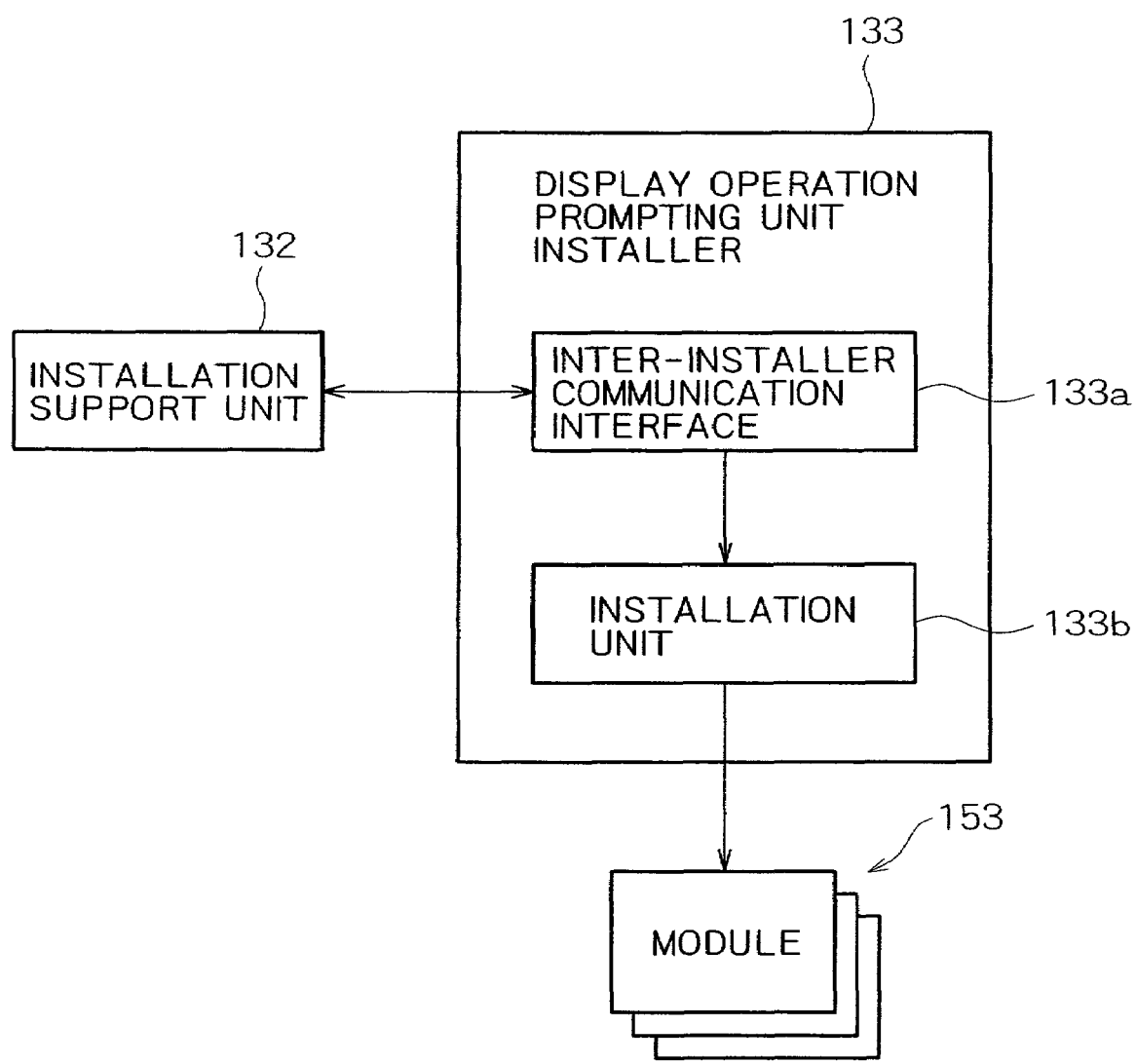
FIG. 8 is a diagram portraying a typical functional structure of a display operation prompting unit installer.

FIG. 8 is a diagram portraying a typical functional structure of the display operation prompting unit installer 133. The display operation prompting unit 135 includes an inter-installer communication interface 133a and an installation unit 133b. The inter-installer communication interface 133a communicates with the installation support unit 132. More specifically, the inter-installer communication interface 133a causes the display operation prompting unit installer 133 to start installing the modules 153 in response to a starting request from the installation support unit 132. Responding to a request from the installation unit 133b, the inter-installer communication interface 133a outputs a starting request to the installation support unit 132. In addition, the inter-installer communication interface 133a receives information about installation status from the installation support unit 132 and hands the received information over to the installation unit 133b.

The installation unit 133b installs the display operation prompting program in response to the user's input operation or a request from the inter-installer communication interface 133a. Upon receipt of information from the inter-installer communication interface 133a about the status of the installation performed by the installation support unit 132, the installation unit 133b causes the display 120 to indicate messages reflecting the received information.

The installation unit 133b may request the installation support unit 132 to install part or all of the display operation prompting program. In that case, the installation unit 133b causes the inter-installer communication interface 133a to output a request to start the installation support unit 132.

Figure 9:
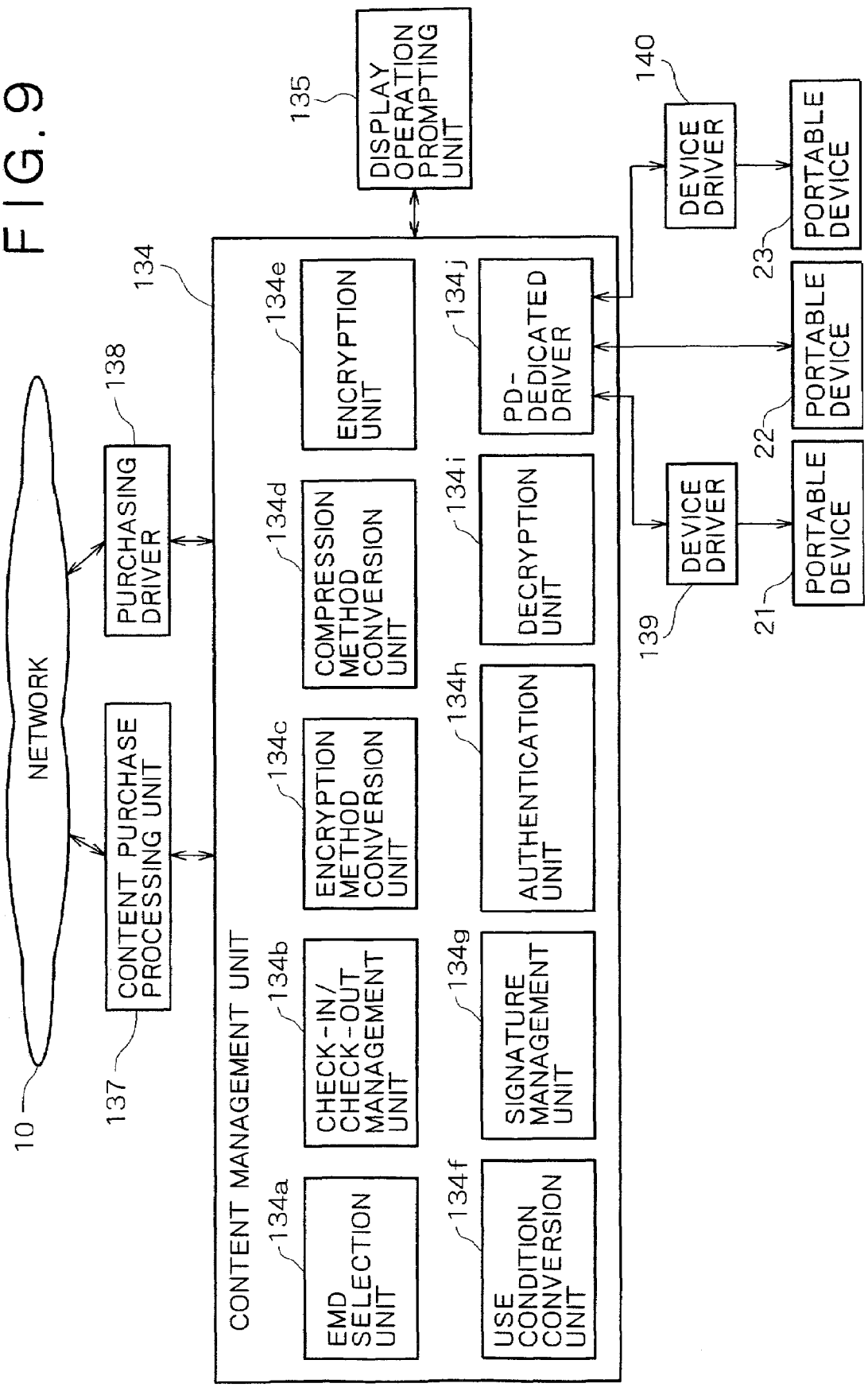
FIG. 9 is a block diagram picturing a typical functional structure of a content management unit.

FIG. 9 is a block diagram picturing a typical functional structure of the content management unit 134. The content management unit 134 includes an EMD selection unit 134a, a check-in/check-out management unit 134b, an encryption method conversion unit 134c, a compression method conversion unit 134d, an encryption unit 134e, a use condition conversion unit 134f, a signature management unit 134g, an authentication unit 134h, a decryption unit 134i, and a PD-dedicated driver 134j.

When the content management unit 134 is installed into the computer 100, the EMD selection unit 134a is not included in the content management unit 134 but is received from the EMD registration server 13 over the network 10 during an EMD registration process. The EMD selection unit 134a selects connection either to the EMD server 14 or to the EMD server 15, allowing the content purchase processing unit 137 or purchasing driver 138 to communicate with the selected EMD server 14 or 15 (e.g., for the purchase of content or for downloading of content).

Based on the check-in or check-out setting in effect and on a use condition file retained in the content database 155, the check-in/check-out management unit 134b checks out contents from content files within the content database 155 to any of the portable devices 21 through 23 or checks in contents from these portable devices 21 through 23.

Following the check-in or check-out process, the check-in/check-out management unit 134b updates use condition data in the use condition file recorded in the content database 155.

The encryption method conversion unit 134c converts the encryption method of incoming contents to that of existing contents in the content files stored by the content database 155, the incoming contents being received by the content purchase processing unit 137 from the EMD server 14 over the network 10 or received by the purchasing driver 138 from the EMD server 15 via the network 10.

When checking out any existing content to any one of the portable devices 21 through 23, the encryption method conversion unit 134c encrypts the content in question by an encryption method compatible with the selected portable device.

The compression method conversion unit 134d converts the compression method of incoming contents to that of existing contents in the content files stored by the content database 155, the incoming contents being received by the content purchase processing unit 137 from the EMD server 14 over the network 10 or received by the purchasing driver 138 from the EMD server 15 via the network 10.

Upon checking out any existing content to any one of the portable devices 21 through 23, the compression method conversion unit 134d compresses the content of interest by a compression method compatible with the portable device in question.

The encryption unit 134e converts (unencrypted) contents, retrieved illustratively from a CD and supplied from the recording unit 136, by the encryption method of existing contents in the content files stored by the content database 155.

The use condition conversion unit 134f converts incoming content use condition data (so-called usage rule) to the format of existing content use condition data in the use condition data file stored by the content database 155, the incoming content use condition data being received by the content purchase processing unit 137 from the EMD server 14 over the network 10 or received by the purchasing driver 138 from the EMD server 15 via the network 10.

Upon checking out any existing content to any one of the portable devices 21 through 23, the use condition conversion unit 134f converts the relevant use condition data into those compatible with the portable device being selected.

Before performing a check-in or check-out process, the signature management unit 134g checks for falsified use condition data based on the signatures included in the use condition data in the use condition file retained by the content database 155. Following the check-in or check-out process, the signature management unit 134g updates the signatures in the use condition data in accordance with any updates in the use condition data in the use condition file stored by the content database 155.

The authentication unit 134h carries out two-way authentication between the content management unit 134 and the content purchase processing unit 137, as well as between the content management unit 134 and the purchasing driver 138. Furthermore, the authentication unit 134h retains authentication keys for use in the two-way authentication between the EMD server 14 and the content purchase processing unit 137 as well as between the EMD server 15 and the purchasing driver 138.

The authentication keys to be utilized by the authentication unit 134h upon two-way authentication are not stored in the unit 134h when the content management unit 134 is installed into the computer 100. These keys are fed from the EMD registration server 13 and stored into the authentication unit 134h only after registration is normally carried out by the display operation prompting unit 135.

The decryption unit 134i decrypts contents when they are to be reproduced by the computer 100 from content files in the content database 155.

When a given content is to be checked out to the portable device 22 or a content is to be checked in therefrom, the PD-dedicated driver 134j supplies the content in question to the portable device 22 or sends relevant commands to the device 22 so that the latter will carry out necessary processing.

When a given content is to be checked out to the portable device 21 or a content is to be checked in therefrom, the PD-dedicated driver 134j supplies the content in question to the device driver 139 or sends relevant commands to the device driver 139 so that the latter will perform necessary processing.

When a given content is to be checked out to the portable device 23 or a content is to be checked in therefrom, the PD-dedicated driver 134j supplies the content in question to the device driver 140 or sends relevant commands to the device driver 140 so that the latter will execute necessary processing.

Figure 10:
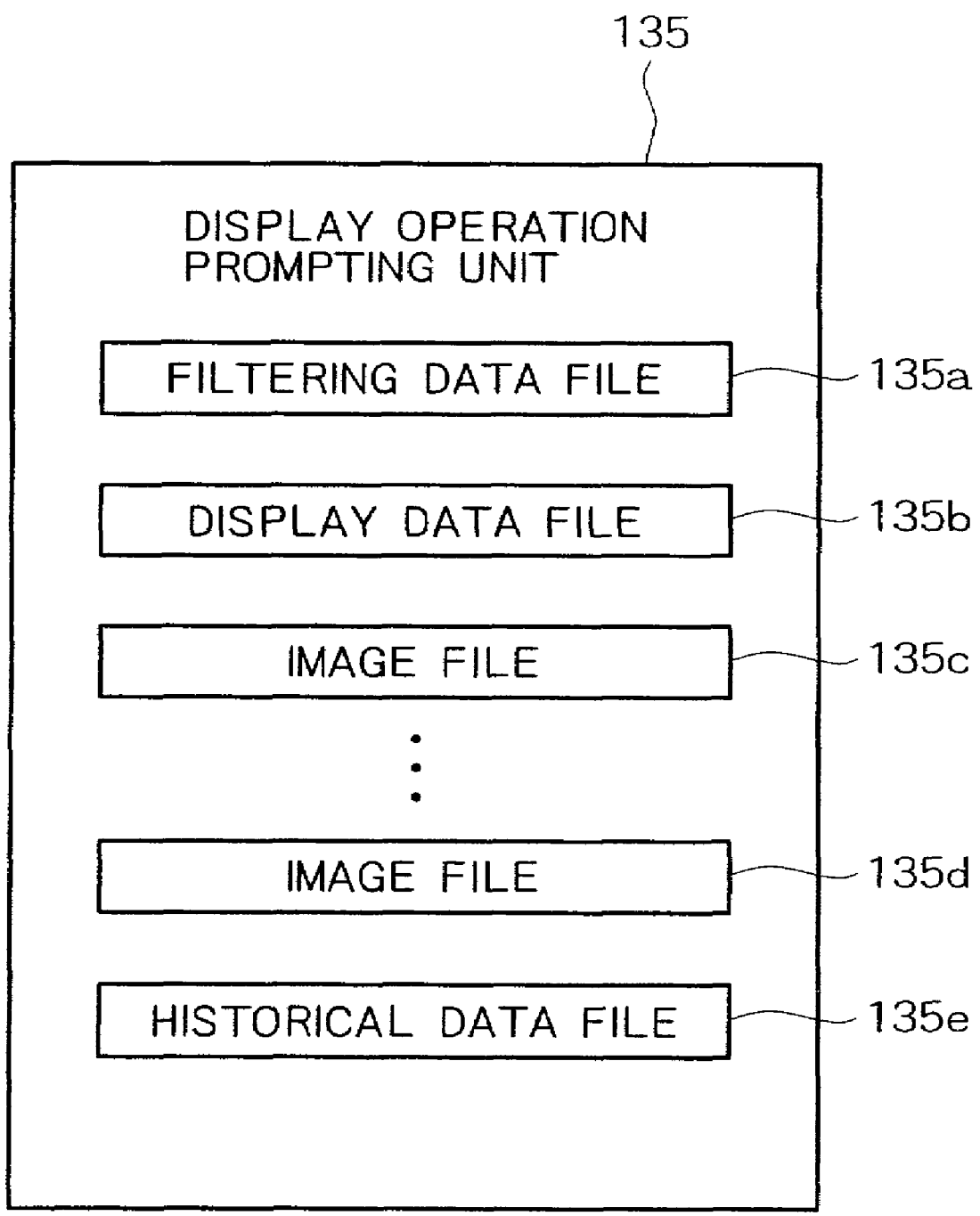
FIG. 10 is a diagram showing a typical functional structure of the display operation prompting unit.

FIG. 10 is a diagram showing a typical functional structure of the display operation prompting unit 135. This display operation prompting unit 135 causes predetermined window images to appear on the display 120 based on a filtering data file 135a, a display data file 135b, image files 135c through 135d, or a historical data file 135e. In keeping with the operations performed through the keyboard 118 or mouse 119, the display operation prompting unit 135 causes the content management unit 134 to perform processes such as the check-in or check-out process.

The filtering data file 135a, recorded on the hard disk drive 121, contains data that are used to assign weights to the contents in the content files retained by the content database 155.

The display data file 135*b*, stored on the hard disk drive 121, contains data corresponding to the contents in the content files retained by the content database 155.

The image files 135*c* through 135*d*, stored on the hard disk drive 121, contains images that correspond either to the content files in the content database 155 or to packages.

The historical data file 135*e*, recorded on the hard disk drive 121, contains such historical data as the number of times each of the contents in the content files in the content database 155 was checked out or checked in, and the dates on which the check-in or check-out processes were carried out.

Figure 11:
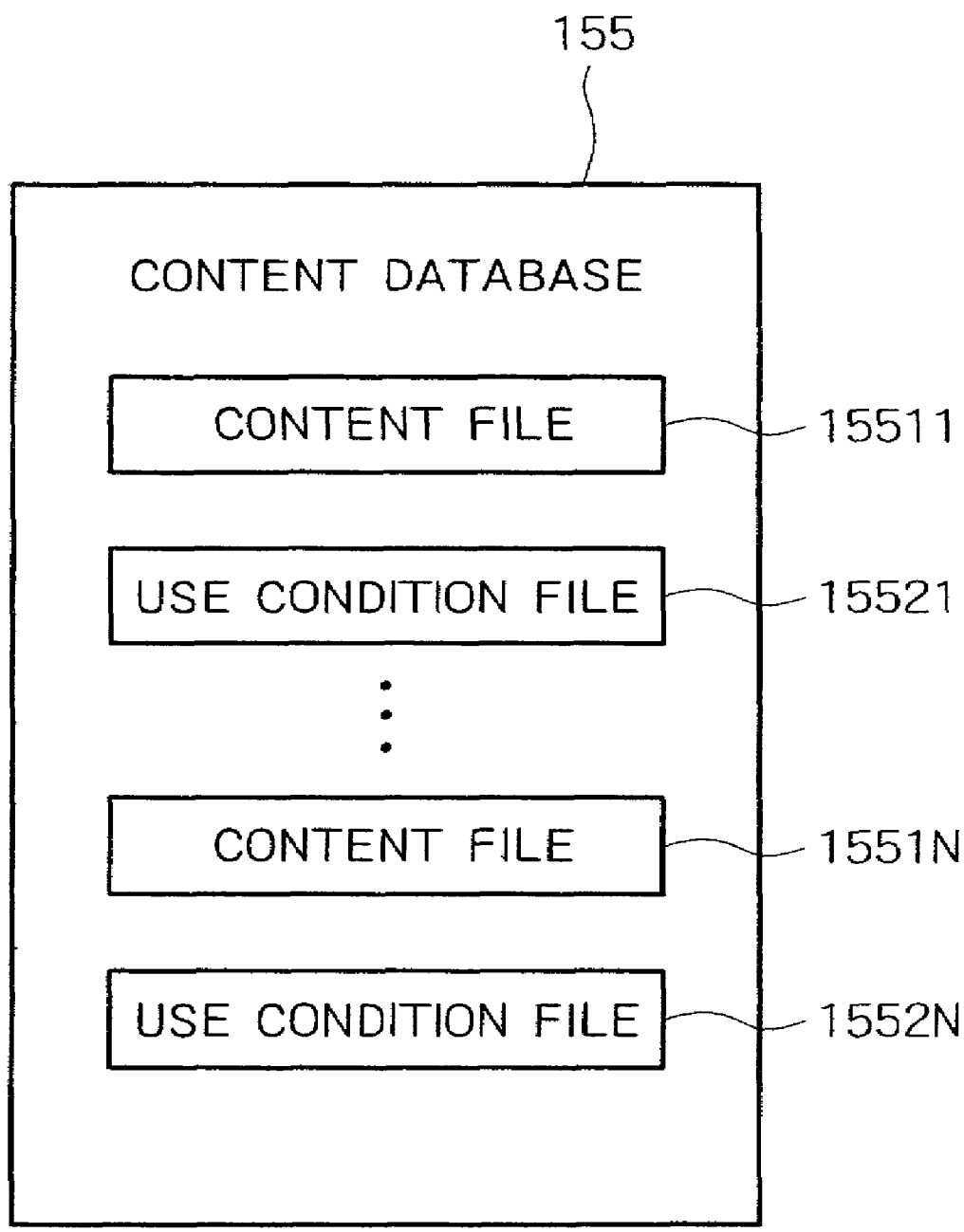
FIG. 11 is a diagram depicting a typical internal structure of a content database.

FIG. 11 is a diagram depicting a typical internal structure of the content database 155. The content database 155 stores contents into any one of content files 15511 through 1551N (on the hard disk drive 121), the contents being supplied from the content management unit 134 after getting compressed and encrypted by suitable methods. The content database 155 also stores use condition data into any one of use condition files 15521 through 1552N (on the hard disk drive 121) corresponding to the content files 15511 through 1551N respectively, the use condition data being associated with the contents stored in the content files 15511 through 1551N respectively.

Alternatively, the content database 155 may store as records the content files 15511 through 1551N or the use condition files 15521 through 1552N.

Illustratively, the use condition data corresponding to the contents stored in the content files 15511 through 1551N are stored in the use condition files 15521 through 1552N respectively.

The computer 100 of the above-described structure permits installation of programs for protecting copyrights of music data or the like and the display operation prompting program for manipulating the music data while protecting the copyrights associated with the data. Described below are procedures for installing the modules constituting such programs.

Figure 12:
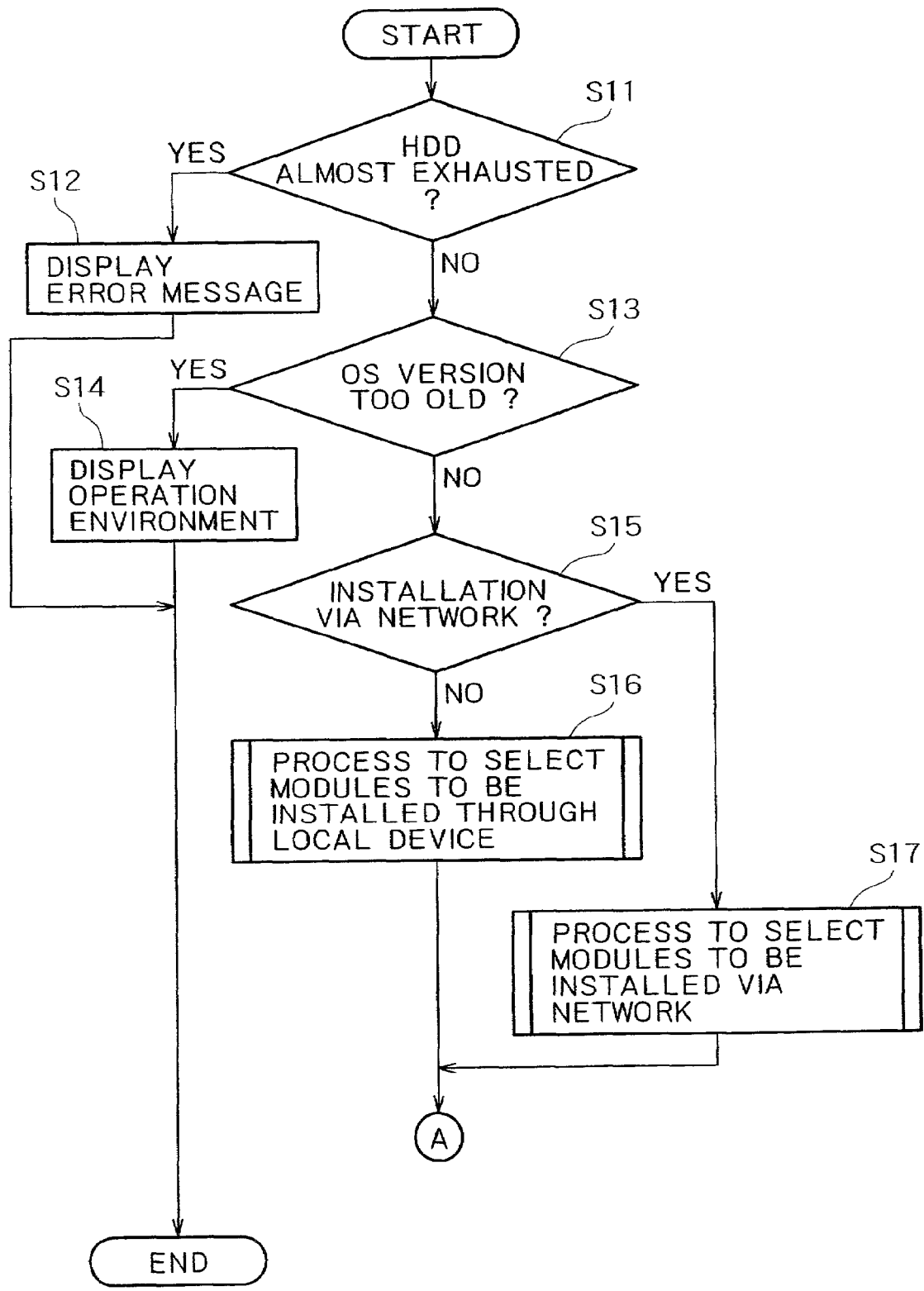
FIG. 12 is the first half of a flowchart of steps constituting a module installation procedure.

FIG. 12 is the first half of a flowchart of steps constituting a module installation procedure. Each of the steps in FIG. 12 is described below in order of the step numbers shown assigned. This procedure is executed by the computer 100 starting the installation support unit 132 based on the installation support program acquired through the installation support program acquisition unit 131.

In step S11 of FIG. 12, the user environment analysis unit 132*c* in the installation support unit 132 determines whether or not the free space of the hard disk drive 121 is almost exhausted. A hard disk drive 121 devoid of free space applies when a memory shortage has caused the OS to issue a warning or when a necessary memory swap space cannot be secured. If the hard disk drive 121 is judged nearly exhausted, step S12 is reached. If the hard disk drive 121 still has available space, then step S13 is reached.

In step S12, the user environment analysis unit 132*c* in the installation support unit 132 causes a message to appear on the display 120 indicating a hard disk capacity shortage, and terminates the processing.

In step S13, the user environment analysis unit 132*c* in the installation support unit 132 determines whether or not the current version number of the OS running on the computer 100 is older than a predetermined version number. If the version number of the OS is judged to be too old, step S14 is reached; otherwise step S15 is reached.

In step S14, the user environment analysis unit 132*c* in the installation support unit 132 displays on the display 120 the environment in which the modules constituting the copyright management program and others can operate and the current environment of the computer 100 (e.g., version number of the OS), and terminates the processing.

In step S15, the installable module determination unit 132*d* judges whether or not installation is to take place via the network 10. The judgment is made illustratively on the user's input operation designating the location of the modules. Where installable modules are located on a locally connected device being scanned (e.g., hard disk drive 121 or CD-ROM loaded in the drive 122), the installation may be judged to take place from that local device. If the installation is not judged to occur via the network 10, step S16 is reached; if the installation is to be carried out through the network 10, then step S17 is reached.

In step S16, the installation support unit 132 performs a module selection process on the local device. The process involves determining the modules to be installed from the local device, as will be described later in more detail. Step S16 is followed by step S18 of FIG. 13 (as shown continued through termination (A)).

In step S17, the installation support unit 132 performs a module selection process over the network 10. The process involves determining the modules to be installed via the network 10, as will be described later in more detail. Step S17 is followed by step S18 of FIG. 13 (as shown continued through termination (A)).

Figure 13:
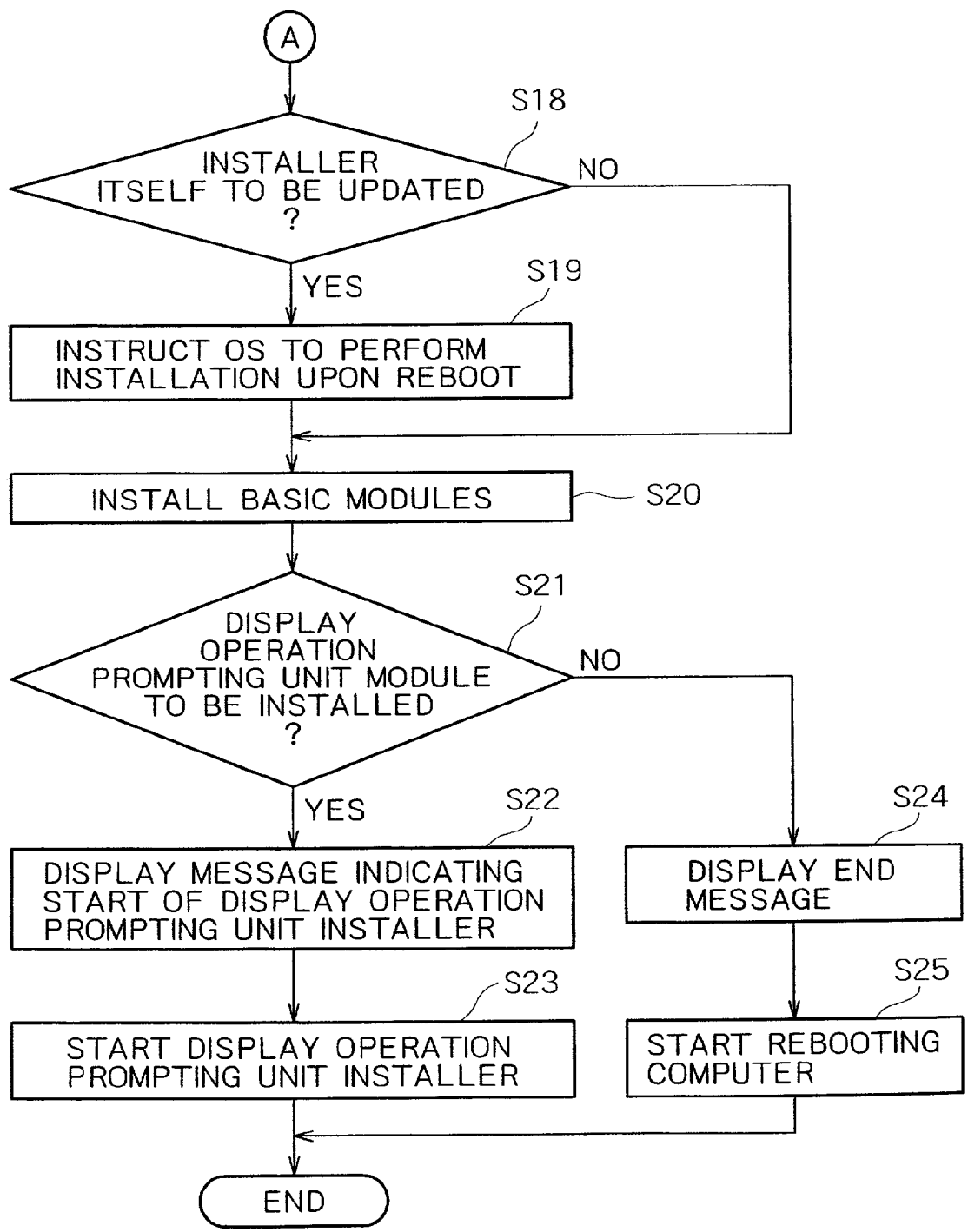
FIG. 13 is the second half of the flowchart of steps constituting the module installation procedure.

FIG. 13 is the second half of the flowchart of steps constituting the module installation procedure. Each of the steps in FIG. 13 is described below in order of the step numbers shown assigned.

In step S18, the installation unit 132*e* in the installation support unit 132 determines whether or not the installation support unit 132 itself is to be updated.

That is, the installation support unit 132 determines whether or not the installation support program is included in the modules selected to be installed in step S16 or S17. If the installation support program is found included in the modules to be installed, then the installation support unit 132 judges that it is going to update itself. If the installation support program is not judged included in the modules to be installed, the installation support unit 132 determines that it is not going to update itself.

If the installation support unit 132 is going to update itself, step S19 is reached; otherwise step S20 is reached.

In step S19, the installation unit 132*e* in the installation support unit 132 sets reboot-executed installation instructions for the OS. More specifically, the installation support unit 132 edits the reboot-executed instruction file 154 by adding necessary instructions to the reboot-executed instruction file 154. The instructions to be added include those for deleting the old installation support program and copying the updated modules of the new installation support program to the location where the old program was stored (i.e., in the same directory of the directory structure).

In step S20, the installation unit 132*e* in the installation support unit 132 installs basic modules. The basic modules are the modules other than those making up the installation support program and the display operation prompting program.

In step S21, the installation unit 132*e* in the installation support unit 132 determines whether or not to install the modules constituting the display operation prompting unit 135.

More specifically, the installation support unit 132 judges whether or not the modules making up the display operation prompting unit 135 are included in the modules selected to be installed in step S16 or 17. If the modules of the display operation prompting unit 135 are found included in the modules selected to be installed, the installation support unit 132 determines that the display operation prompting unit 135 are to be installed. If the modules of the display operation prompting unit 135 are not found among the modules selected to be installed, the installation support unit 132 determines that the display operation prompting unit 135 will not be installed.

If the modules constituting the display operation prompting unit 135 are to be installed, step S22 is reached; if these modules are not to be installed, then step S24 is reached.

In step S22, the installation unit 132e in the installation support unit 132 causes a message to appear on the display 120 indicating that the display operation prompting unit installer 133 is going to be started.

In step S23, the installation unit 132e in the installation support unit 132 activates the display operation prompting unit installer 133. Thereafter the installer 133 starts installing the modules making up the display operation prompting unit 135. When installation of the modules is completed, the processing is terminated.

In step S24, the installation unit 132e in the installation support unit 132 gives an installation end message on the display 120.

In step S25, the installation unit 132e in the installation support unit 132 issues a reboot instruction to the OS and terminates the processing. Upon receipt of the reboot instruction, the computer 100 executes a reboot process.

The necessary modules are installed into the computer 100 in the manner described above. If the procedures in FIGS. 12 and 13 are carried out at the request of the display operation prompting unit installer 133, the result of the processing is reported to the installer 133.

Figure 14:
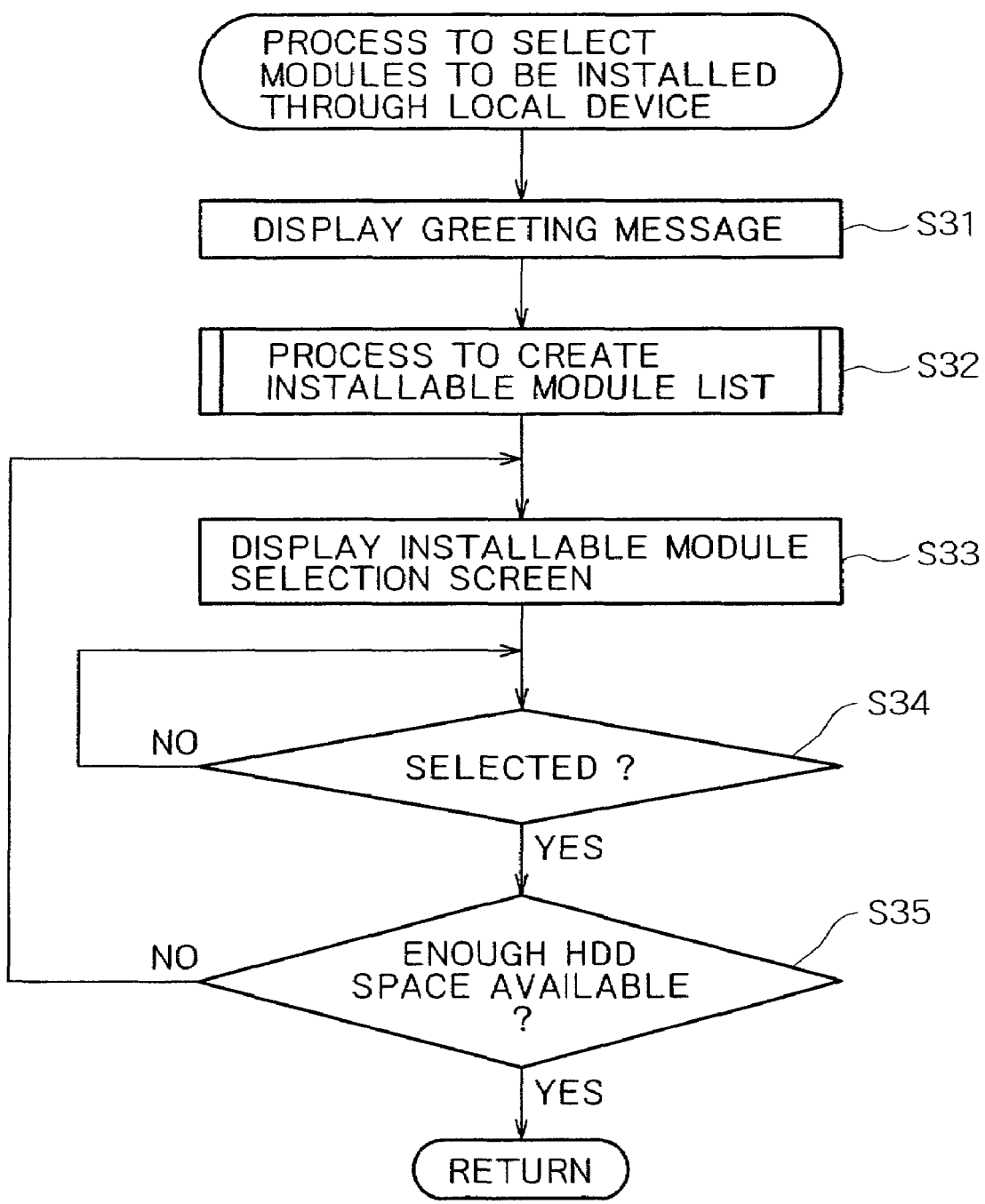
FIG. 14 is a flowchart of steps constituting a typical process to select modules to be installed through a local device.

FIG. 14 is a flowchart of steps constituting a typical process to select modules to be installed through a local device. Each of the steps in FIG. 14 is described below in order of the step numbers shown assigned.

In step S31 of FIG. 14, the installable module determination unit 132d in the installation support unit 132 displays on the display 120 a greeting message for installation of modules from a local device.

In step S32, the installable module determination unit 132d in the installation support unit 132 creates an installable module list. Details of this process will be described later.

In step S33, the installable module determination unit 132d in the installation support unit 132 causes an installable module selection screen to appear on the display 120.

In step S34, the installable module determination unit 132d in the installation support unit 132 determines whether or not any installable modules have been selected by the user. If such modules are judged to have been selected, step S35 is reached; otherwise step S34 is repeated.

In step S35, the installable module determination unit 132d in the installation support unit 132 judges whether or not the hard disk drive 121 has enough free space. More specifically, the installation support unit 132 calculates the necessary disk capacity for installing all modules selected by the user, and checks to see if the hard disk drive 121 has at least the calculated capacity. If the hard disk drive 121 is judged to have a sufficient free space, then the current process of selecting modules to be installed through the local device is terminated, and step S18 of FIG. 13 is reached. If the available space is not sufficient, then step S33 is reached and installable modules are again selected by the user.

Figure 15:
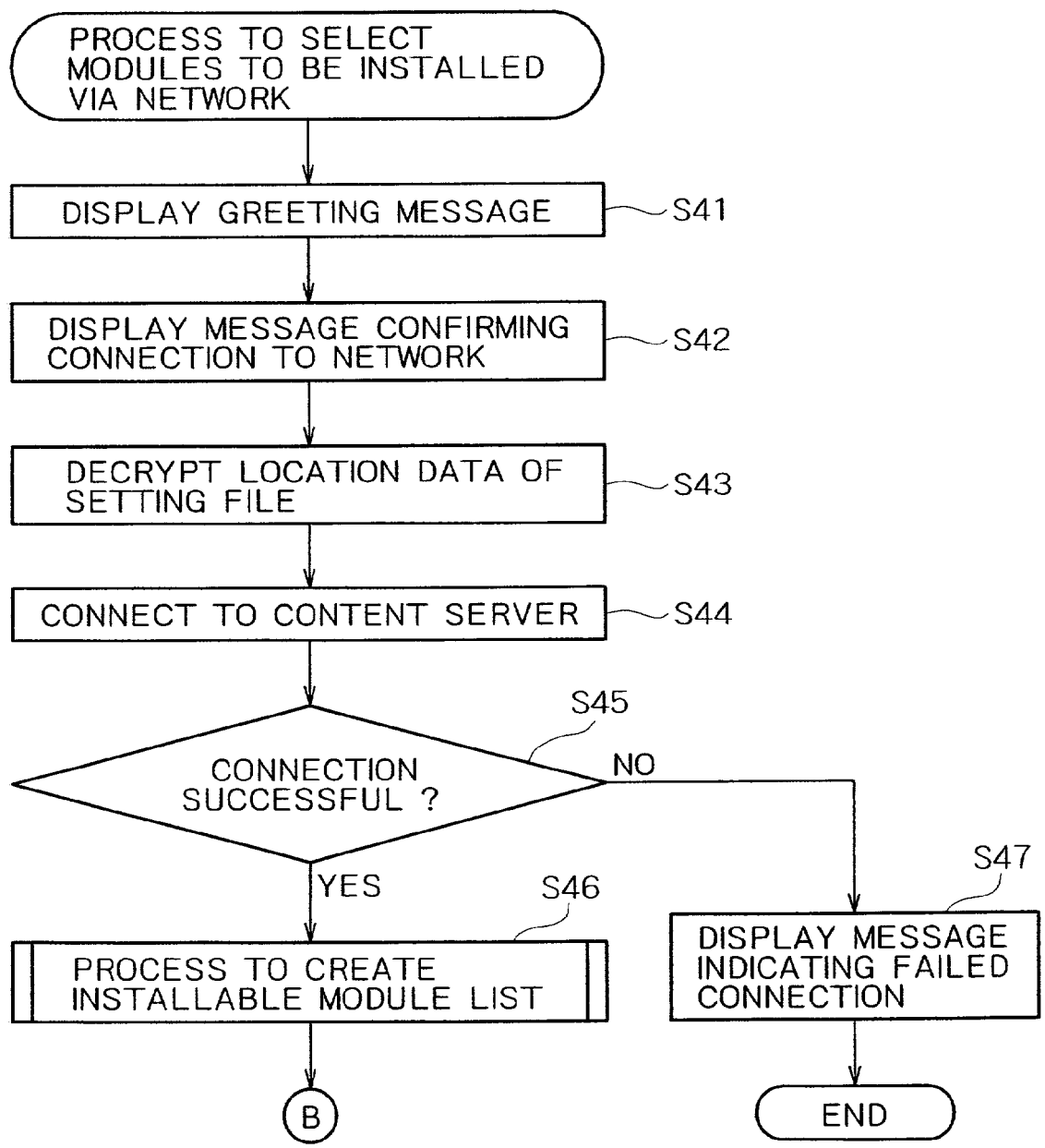
FIG. 15 is the first half a flowchart of steps constituting a typical process to select modules to be installed via a network.

FIG. 15 is the first half of a flowchart of steps constituting a typical process to select modules to be installed via a network. Each of the steps in FIG. 15 is described below in order of the step numbers shown assigned.

In step S41 of FIG. 15, the download unit 132a in the installation support unit 132 displays on the display 120 a greeting message indicating that installation is to take place via the network 10.

In step S42, the download unit 132a in the installation support unit 132 displays on the display 120 a message confirming that the computer is going to connect with another server via the network 10 In step S43, the decryption unit 132b in the installation support unit 132 decrypts the location file 141a defining where the setting file 152 is located.

In step S44, the download unit 132a in the installation support unit 132 attempts to establish connection via the network 10 with the server at the location defined by the location file 141a (e.g., content management program offering server 11).

In step S45, the download unit 132a in the installation support unit 132 judges whether or not connection with the server is successfully established. If the connection is judged successful, step S46 is reached; if the connection is judged to have failed, step S47 is reached.

In step S46, the installation support unit 132 performs a process to create an installable module list. Details of the process will be described later. Step S46 is followed by step S48 in FIG. 16 through termination B as indicated.

In step S47, the download unit 132a in the installation support unit 132 causes a message to appear on the display 120 indicating a failed connection, and terminates the processing.

Figure 16:
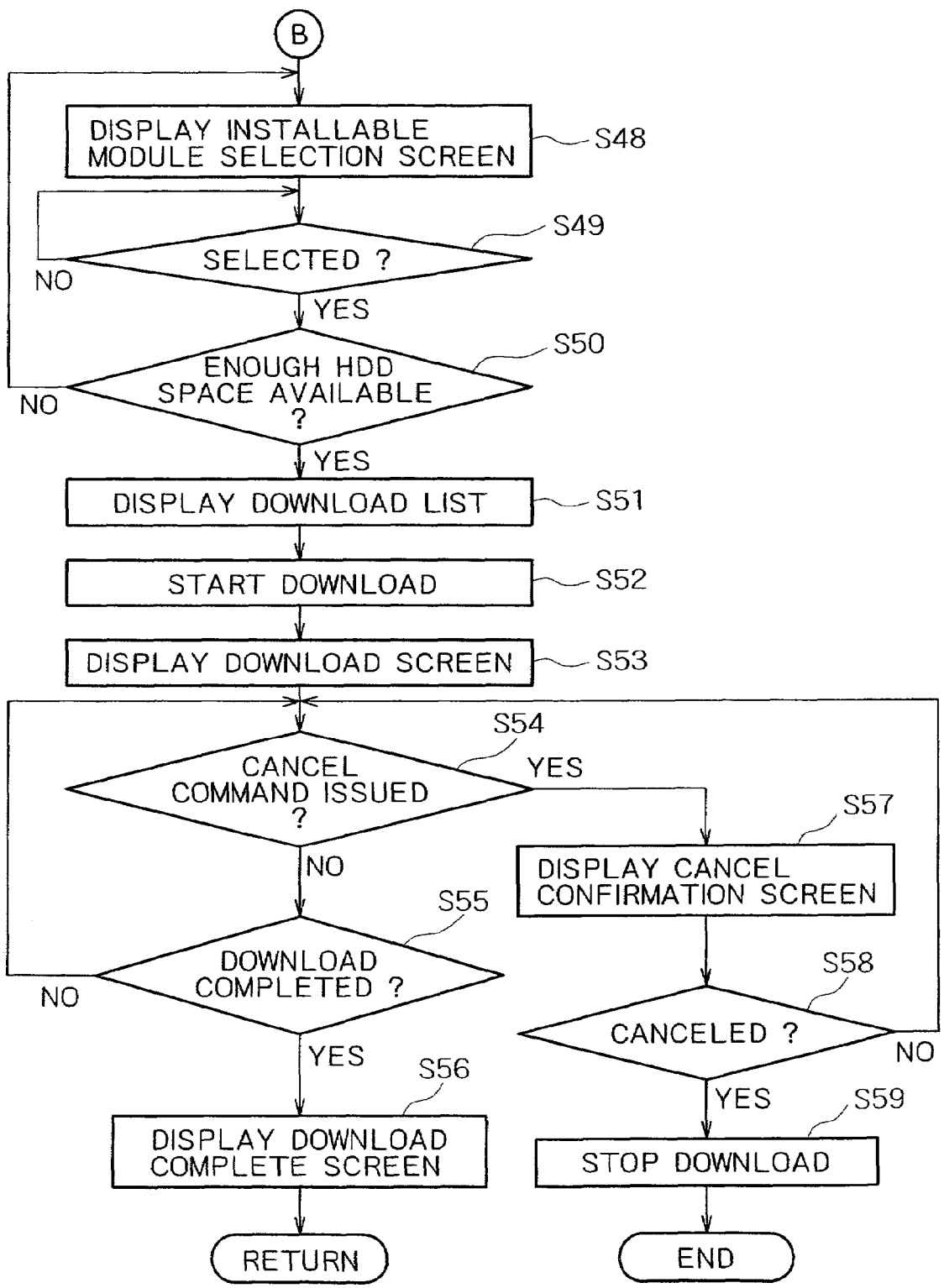
FIG. 16 is the second half of the flowchart of steps constituting the process to select modules to be installed via the network.

FIG. 16 is the second half of the flowchart of steps constituting the process to select modules to be installed via the network. Each of the steps in FIG. 16 is described below in order of the step numbers shown assigned.

In step S48, the installable module determination unit 132d in the installation support unit 132 displays an installable module selection screen on the display 120.

In step S49, the installable module determination unit 132d in the installation support unit 132 judges whether or not any installable modules have been selected by the user's input operations. If installable modules are judged to have been selected, step S50 is reached; if no such modules are selected, step S49 is repeated.

In step S50, the installable module determination unit 132d in the installation support unit 132 judges whether or not the hard disk drive 121 has enough free space. More specifically, the installation support unit 132 calculates the necessary disk capacity for installing all modules selected by the user, and checks to see if the hard disk drive 121 has at least the calculated capacity. If the hard disk drive 121 is judged to have the sufficient free space, step S51 is reached. If the available space is not sufficient, then step S48 is reached and installable modules are again selected by the user.

In step S51, the installable module determination unit 132d in the installation support unit 132 transfers to the download unit 132a a list of user-selected modules and must-installed modules (the list is called a download list). The download unit 132a shows the download list on the screen of the display 120.

In step S52, the download unit 132a in the installation support unit 132 refers to the setting file to find out the locations of the modules registered in the file, and starts downloading the modules from the servers corresponding to the located modules. Download of each module is performed in the background (i.e., as a task different from the tasks that are carried out primarily by the user).

In step S53, the download unit 132a in the installation support unit 132 displays a download screen on the display 120 indicating that downloading is underway.

In step S54, the download unit 132a in the installation support unit 132 judges whether or not a download cancel command is issued by the user's operation. If the cancel command is not issued, step S55 is reached; if the cancel command is judged issued, step S57 is reached.

In step S55, the download unit 132a in the installation support unit 132 determines whether or not downloading is completed. If the download is judged completed, step S56 is reached; if the download has yet to be completed, step S54 is reached again.

In step S56, the download unit 132a in the installation support unit 132 causes a download complete screen to appear on the display 120 indicating that the download has been completed. Step S56 is followed by step S18 in FIG. 13.

In step S57, the download unit 132a in the installation support unit 132 displays on the display 120 a cancel confirmation screen so as to ascertain whether the cancel command is indeed issued by the user.

In step S58, the download unit 132a in the installation support unit 132 checks to see whether or not the user has confirmed the cancel command on the cancel confirmation screen. If the user is judged to have performed the operation confirming the cancellation, step S59 is reached. If the user is found to have annulled the cancellation on the cancel confirmation screen, then step S54 is reached again.

In step S59, the download unit 132a in the installation support unit 132 halts the download and terminates the processing.

Figure 17:
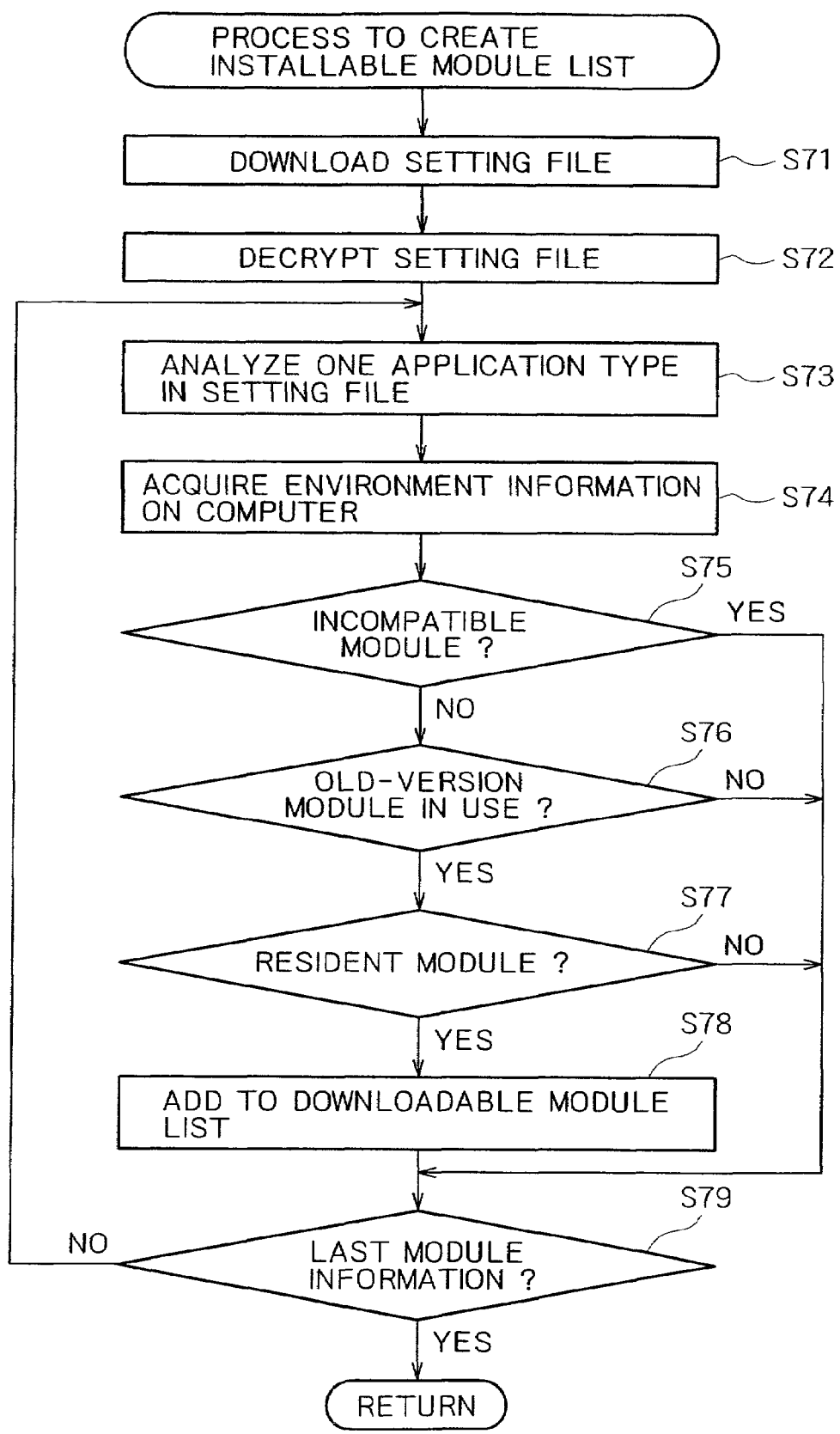
FIG. 17 is a flowchart of steps constituting a typical process to create an installable module list.

FIG. 17 is a flowchart of steps constituting a typical process to create an installable module list. Each of the steps in FIG. 17 is described below in order of the step numbers shown assigned.

In step S71, the download unit 132a in the installation support unit 132 downloads the setting file from the applicable server. The download unit 132a hands the downloaded setting file over to the decryption unit 132b.

In step S72, the decryption unit 132b in the installation support unit 132 decrypts the setting file.

In step S73, the installable module determination unit 132d in the installation support unit 132 selects any one of unselected module information items from the setting file and analyzes the application type of the selected module information.

In step S74, the installable module determination unit 132d in the installation support unit 132 acquires environment information about the computer 100. The environment information includes not only the version numbers of the currently installed modules but also the version numbers of the other modules (those of the OS, device drivers, etc.) working in cooperation with these modules.

In step S75, the installable module determination unit 132d in the installation support unit 132 compares the environment information acquired in step S74 with the module information selected in step S73, and judges whether or not the module in question is incompatible.

The module is judged incompatible illustratively when a licensing agreement between the OS vendor and the provider of the module in question does not allow that module to be installed under a specific version of the OS. Judging whether or not the licensing agreement involved is satisfied to let the module operate under the OS is one precondition for allowing the module to be installed.

Some licenses prohibit distribution of the modules over the network or otherwise restrict the routes of module distribution. With such eventualities taken into account, the installable module determination unit 132d finds out the route through which each module has been acquired and judges whether or not that route is admissible under the licensing agreement in effect. The route of module acquisition is determined illustratively by referring to the description of locations in the setting file. If URLs are used to describe module locations in the file, the corresponding modules are judged to have been acquired via the network 10. If relative paths of the directory structure are described as module locations, that means the modules have been acquired from a storage medium such as a CD-ROM.

Information denoting what kinds of cases involve incompatible modules is defined illustratively within the installation support program. Alternatively, such information is included in the "Remarks" fields of the module information 152a in the setting file so that the information may be downloaded together with the setting file.

If the module corresponding to the module information selected in step S73 is judged to be an incompatible module, step S79 is reached. If the module represented by the module information selected in step S73 turns out to be a compatible module, step S76 is reached.

In step S76, the installable module determination unit 132d in the installation support unit 132 determines whether or not an old-version module is in use. If the old-version module is found to be used, step S77 is reached; if the old-version module is not in use, step S79 is reached.

In step S77, the installable module determination unit 132d in the installation support unit 132 judges whether or not the module in question is a resident module in the computer 100. The resident module is a module whose environment information describes it as resident in the computer and which is actually stored at a specific location of the computer. A non-resident module, by contrast, is a module whose environment information describes it as resident in the computer but which is not actually stored at any specific location of the computer.

If the module is found to be a resident module, step S78 is reached. If the module is judged non-resident, then step S79 is reached.

In step S78, the installable module determination unit 132d in the installation support unit 132 adds the module information selected in step S73 to the downloadable module list.

In step S79, the installable module determination unit 132d in the installation support unit 132 determines whether or not the module information selected in step S73 is the last module information (i.e., unselected module information no longer exists). If the selected module information is judged to be the last module information, step S33 in FIG. 14 is reached. If the module information is other than the last module information, step S73 is reached again.

As described above, of the installable modules constituting the content management program and display operation prompting program, those that are considered indispensable and those selected by the user are installed into the computer 100.

Where the modules defining the workings of the installation support unit 132 itself (i.e., installation support program) are to be updated, the actual installation is carried out when the computer 100 is rebooted. What takes place upon reboot is described below.

Figure 18:
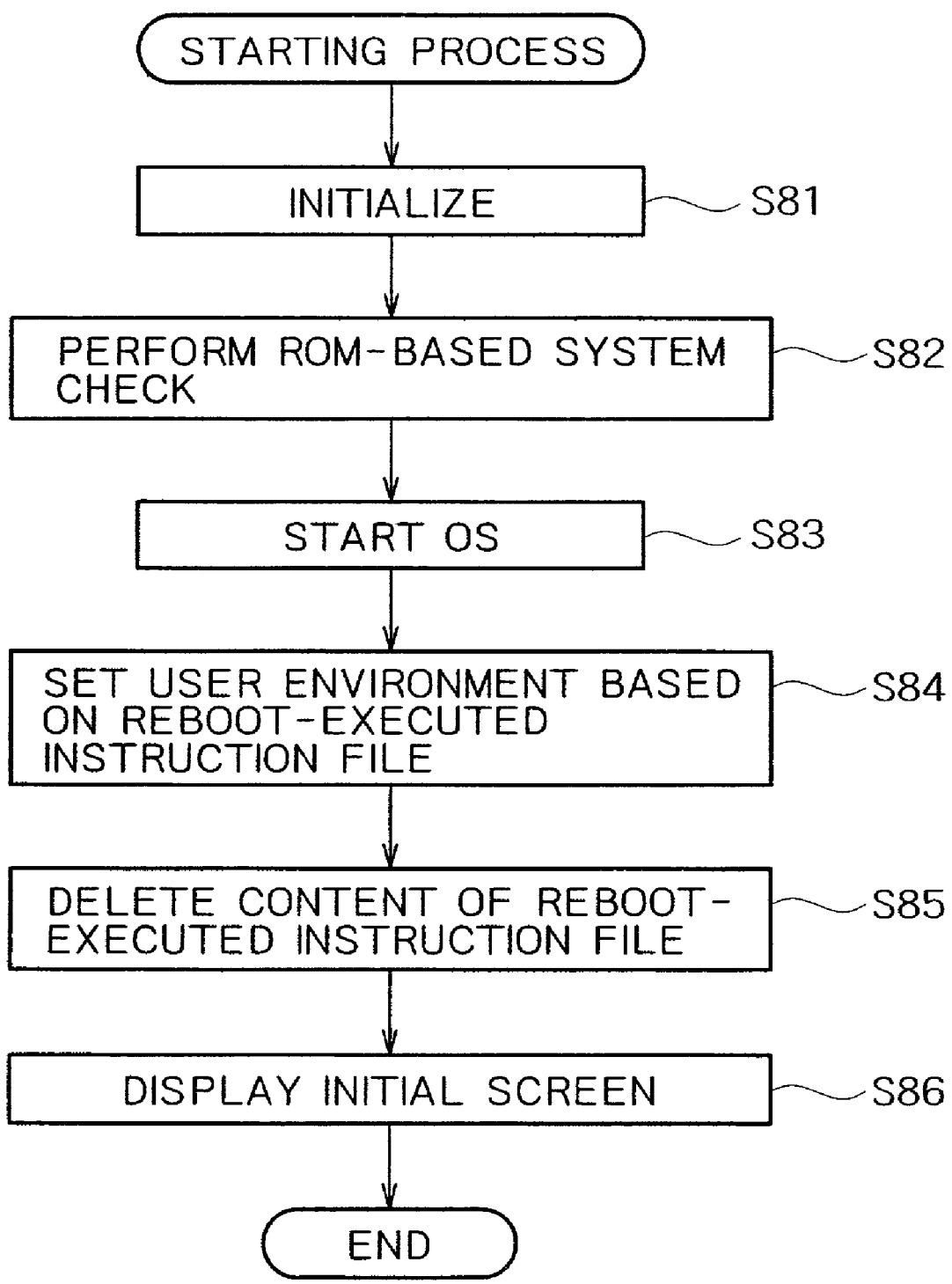
FIG. 18 is a flowchart of steps constituting a typical reboot process of the computer.

FIG. 18 is a flowchart of steps constituting a typical reboot process of the computer 100. Each of the steps in FIG. 18 is described below in order of the step numbers shown assigned. It should be noted that the process of FIG. 18 is a process that is carried out when the computer 100 is started up or fed with power.

In step S81, the computer 100 is initialized using the programs stored in the ROM 112. Initialization of the computer 100 illustratively involves setting initial values to the registers of the CPU 111 and resetting the host bus 114 and external bus 116.

In step S82, the computer 100 performs a ROM-based system check that typically involves verifying the storage capacity of the RAM 113 and detecting the hard disk drive 121 being connected.

In step S83, the computer 100 starts the OS. An IPL (initial program loader), located illustratively in a specific region on the hard disk drive 121, is loaded by the computer 100 from there into the RAM 113. The computer 100 then loads the main body of the OS from the hard disk drive 121 in accordance with the IPL, whereby the OS is started.

When programs constituting part of the OS are loaded into the RAM 113 so that further processes will be performed by these loaded programs of the OS, the following steps are carried out:

In step S84, the OS establishes the user environment in accordance with the instructions described in the reboot-executed instruction file 154. If the reboot-executed instruction file 154 contains instructions designating installation of the installation support program, then the OS installs the installation support program. Illustratively, the OS deletes the old installation support program from a specific location and copies from somewhere else the modules making up the new installation support program to that location where the old program was stored.

In step S85, the OS deletes the contents of the reboot-executed instruction file. That is, the instructions contained in the reboot-executed instruction file are executed only once and will not be carried out next time the OS is rebooted.

In step S86, the OS displays an initial screen on the display 120 upon completion of the reboot and terminates the processing.

In this manner, the installation support program is installed by the OS at the time of its reboot.

What follows is a description of how the above-described system typically installs "OpenMG" (registered trademark) which is a computer management program with capabilities to protect copyrights of music data, and "Jukebox," a display operation prompting program for music data. Examples of the setting file and typical display screens in effect upon program installation are explained below.

FIGS. 19A and 19B show descriptive examples of setting files. FIG. 19A is a diagram of a setting file 152b described for acquiring modules via a network, and FIG. 19B is a diagram of a setting file 152c described for acquiring modules from a CD-ROM.

The setting file 152b for module acquisition over the network describes module information about an installer of a computer management program called [OpenMG Installer], module information about a computer management program called [OpenMG Core], and module information about a display operation prompting program called [Any Jukebox]. The setting file 152c for module acquisition from a CD-ROM describes module information about the display operation prompting program [Any Jukebox].

The setting files 152b and 152c shown in FIGS. 19A and 19B are text-format files. In these examples, the common name of module information involved is described in parentheses. The parenthesized description comes at the top of the information about the module in question.

The application type is indicated as "app type=," sub-application type as "sub app type=," application name as "app name=," location as "repository=," version number as "version=," and must-installed flag as "must=."

The setting file 152b for module acquisition over the network has its location descriptions paired with a URL each. The setting file 152c for module acquisition from the CD-ROM contains relative paths making up a location description.

Typical transitions of display screens will now be described by referring to FIGS. 20 through 25.

Figure 20:
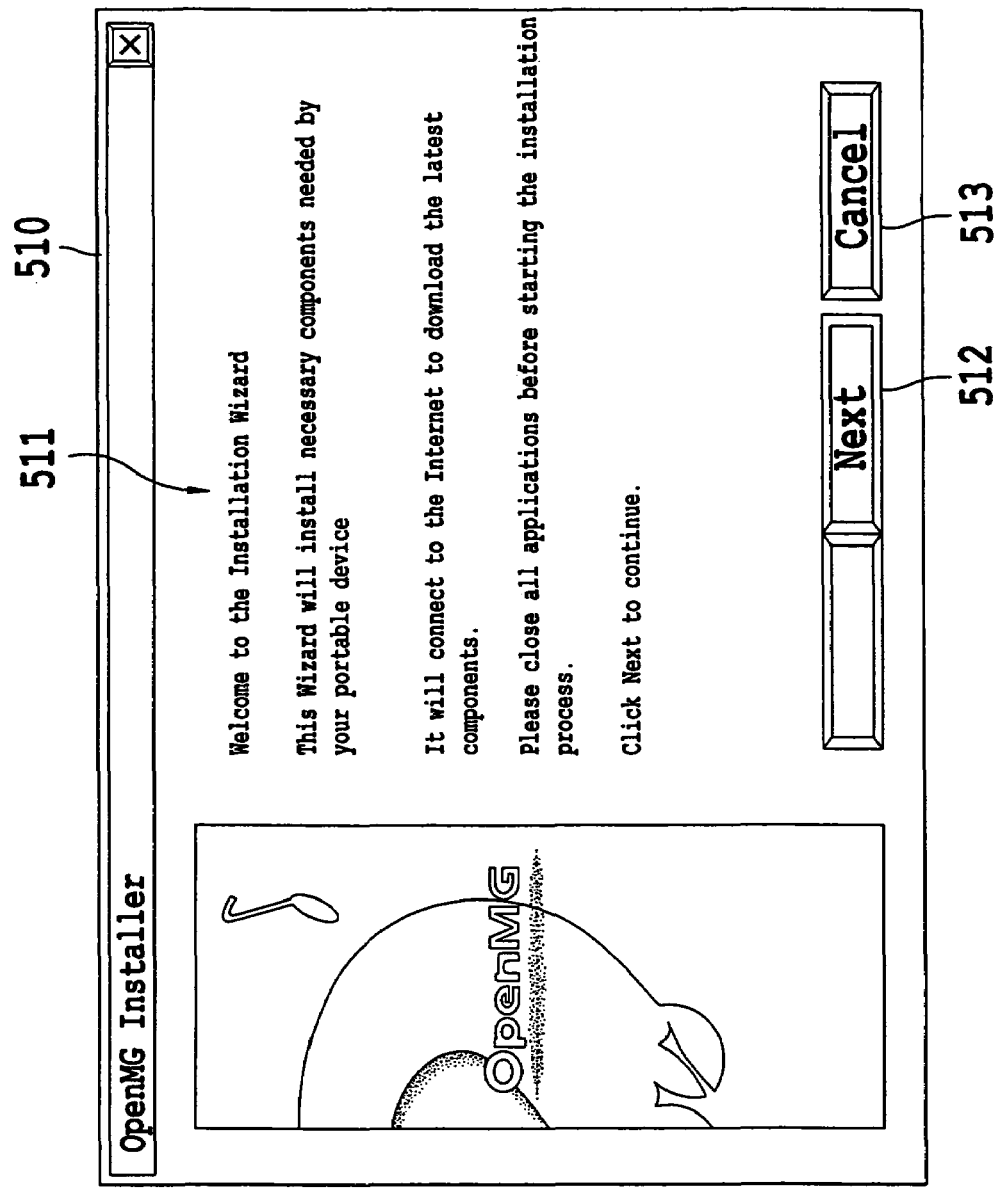
FIG. 20 is a view of a typical initial screen that appears upon startup of an installation support program.

FIG. 20 is a view of a typical initial screen 510 displayed upon startup of the installation support program. The initial screen 510 in FIG. 20 appears when modules are to be downloaded over the network (e.g., the Internet).

The initial screen 510 includes a greeting message display area 511, a Next button 512, and a Cancel button 513. The greeting message display area 511 indicates greetings such as a welcome message and messages informing the user that modules (called components here) are to be downloaded over the Internet. The Next button 512 is pushed for transition to the next screen. In this example, pushing the Next button 512 causes a network connection confirmation screen to appear on the display 120. The Cancel button 513 is pushed in order to cancel execution of the installation support unit. Specifically, pushing the Cancel button 513 halts execution of the installation support unit and causes the initial screen 510 to disappear from the display 120.

Figure 21:
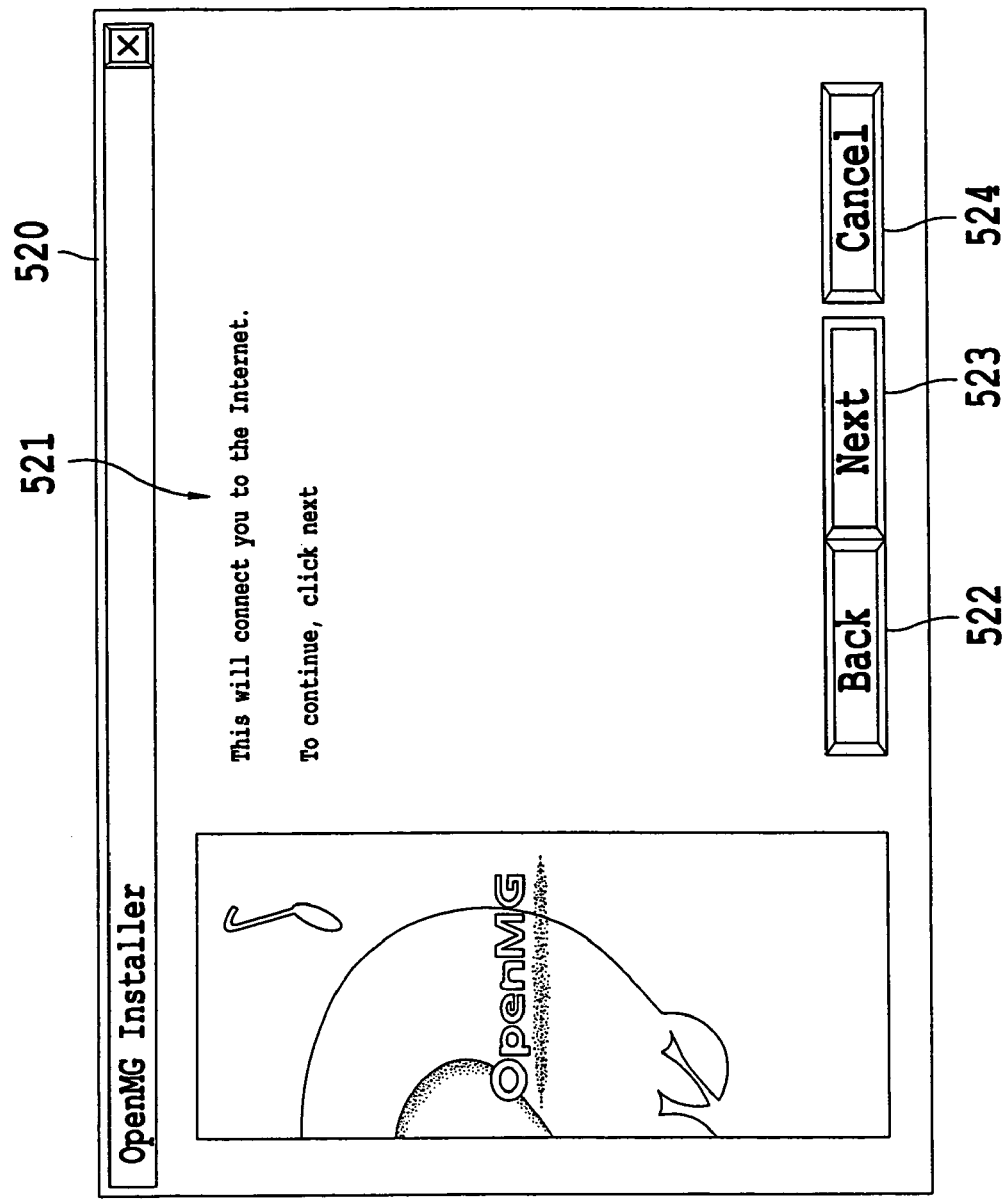
FIG. 21 is a view of a typical network connection confirmation screen.

FIG. 21 is a view of a typical network connection confirmation screen 520. The network connection confirmation screen 520 includes a connection confirmation message display area 521, a Back button 522, a Next button 523, and a Cancel button 524. The connection confirmation message display area 521 indicates a message saying that connection with the network is about to be established.

The Back button 522 is pushed in order to go back to the preceding screen. In this case, pushing the Back button 522 brings the initial screen 510 of FIG. 20 back onto the display 120. The Next button 523 is pushed for transition to the next screen. Pushing the Next button 523 here causes an installable module selection screen to appear on the display 120. The Cancel button 524 is pushed in order to cancel execution of the installation support unit and causes the network connection confirmation screen 520 to disappear from the display 120.

Figure 22:
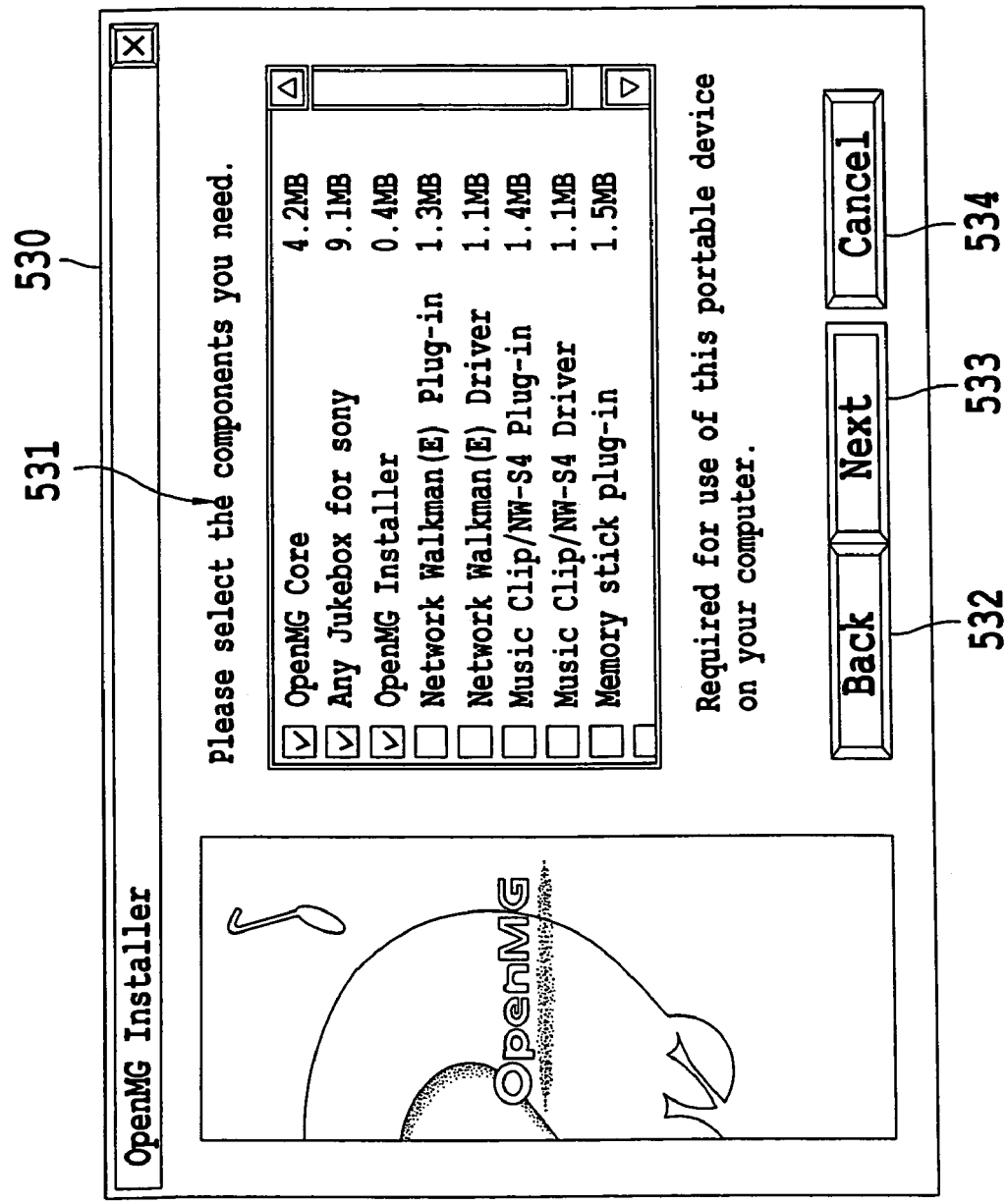
FIG. 22 is a view of a typical installable module selection screen.

FIG. 22 is a view of a typical installable module selection screen 530. This screen 530 includes an installable module selection area 531, a Back button 532, a Next button 533, and a Cancel button 534.

The installable module selection area 531 displays the names of the modules contained in the installable module list. In the installable module selection area 531, each module name is furnished with a check box. The user may pick the check boxes of the modules desired to be installed using a mouse or the like. Each check box thus designated is given a check mark indicating that the corresponding module has been selected for installation.

The Back button 532 is pushed in order to go back to the preceding screen. In this case, pushing the Back button 532 brings the network connection confirmation screen 520 of FIG. 21 back onto the display 120. The Next button 533 is pushed for transition to the next screen. Pushing the Next button 533 here causes a downloadable module list display screen to appear on the display 120. The Cancel button 534 is pushed in order to cancel execution of the installation support unit. In this example, pushing the Cancel button 534 halts execution of the installation support unit and causes the installable module selection screen 530 to disappear from the display 120.

Figure 23:
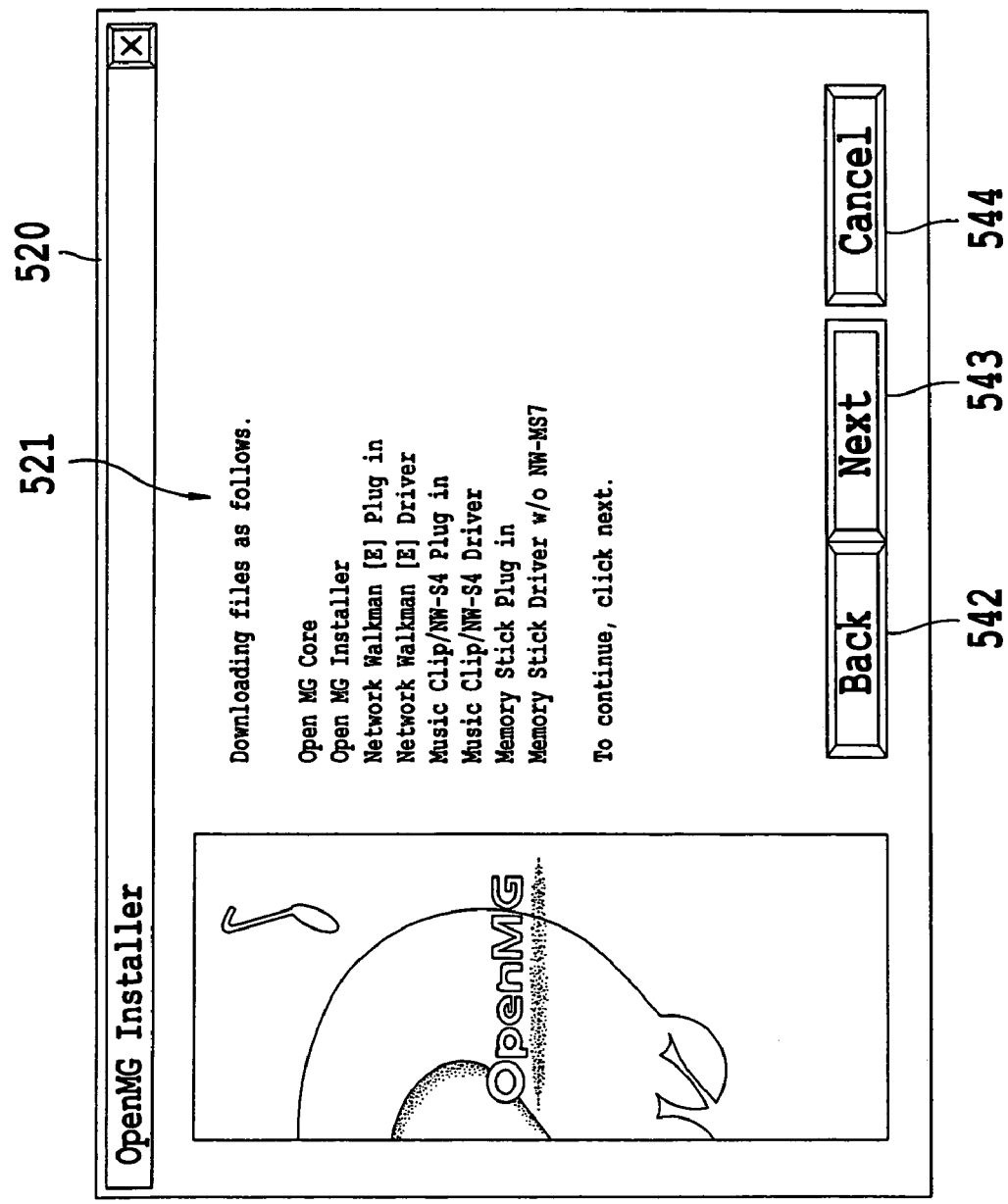
FIG. 23 is a view of a typical downloadable module list display screen.

FIG. 23 is a view of a typical downloadable module list display screen 540. The downloadable module list display screen 540 includes a downloadable module list display area 541, a Back button 542, a Next button 543, and a Cancel button 544.

The downloadable module list display area 541 shows the names of the modules selected on the installable module selection screen 530.

The Back button 542 is pushed in order to return to the preceding screen. In this example, pushing the Back button 542 brings the installable module selection screen 530 of FIG. 22 back onto the display 120. The Next button 543 is pushed for transition to the next screen. Pushing the Next button 543 here causes a download screen to appear on the display 120. The Cancel button 544 is pushed in order to cancel execution of the installation support unit. Pushing the Cancel button 544 here halts execution of the installation support unit and causes the downloadable module list display screen 540 to disappear from the display 120.

Figure 24:
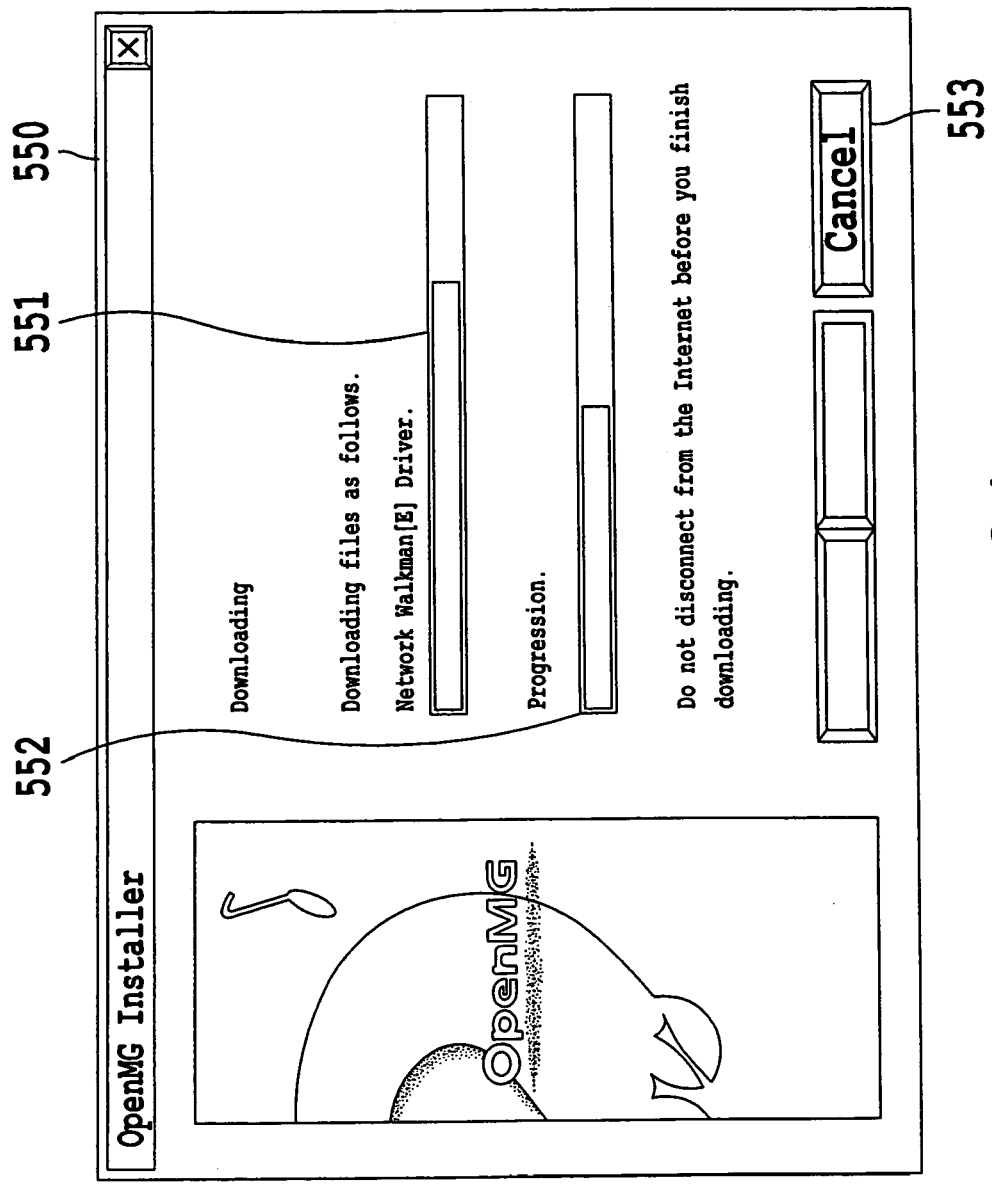
FIG. 24 is a view of a typical download screen.

FIG. 24 is a view of a typical download screen 550. The download screen 550 includes a module download progress status display area 551, a download processing progress status display area 552, and a Cancel button 553.

The module download progress status display area 551, appearing for each module, displays in indicator fashion the name of the module currently being downloaded along with the download progress status of that module. By means of a darkened portion in the indicator, the module download progress status display area 551 shows the percentage of the already downloaded data as part of the whole module in question.

The download processing progress status display area 552 displays in indicator fashion the progress status of all target modules being downloaded. By means of a darkened portion in the indicator, the download processing progress status display area 552 shows the percentage of the already downloaded modules as part of all modules being targeted for download.

The Cancel button 553 is pushed in order to cancel execution of the installation support unit. Pushing the Cancel button 553 here halts execution of the installation support unit and causes the download screen 550 to disappear from the display 120.

When all target modules have been downloaded, the display 120 shows a download complete screen, not shown, followed by the installation of the downloaded modules. If installation of the display operation prompting program is not carried out, the display screen 120 indicates the installation complete screen.

Figure 25:
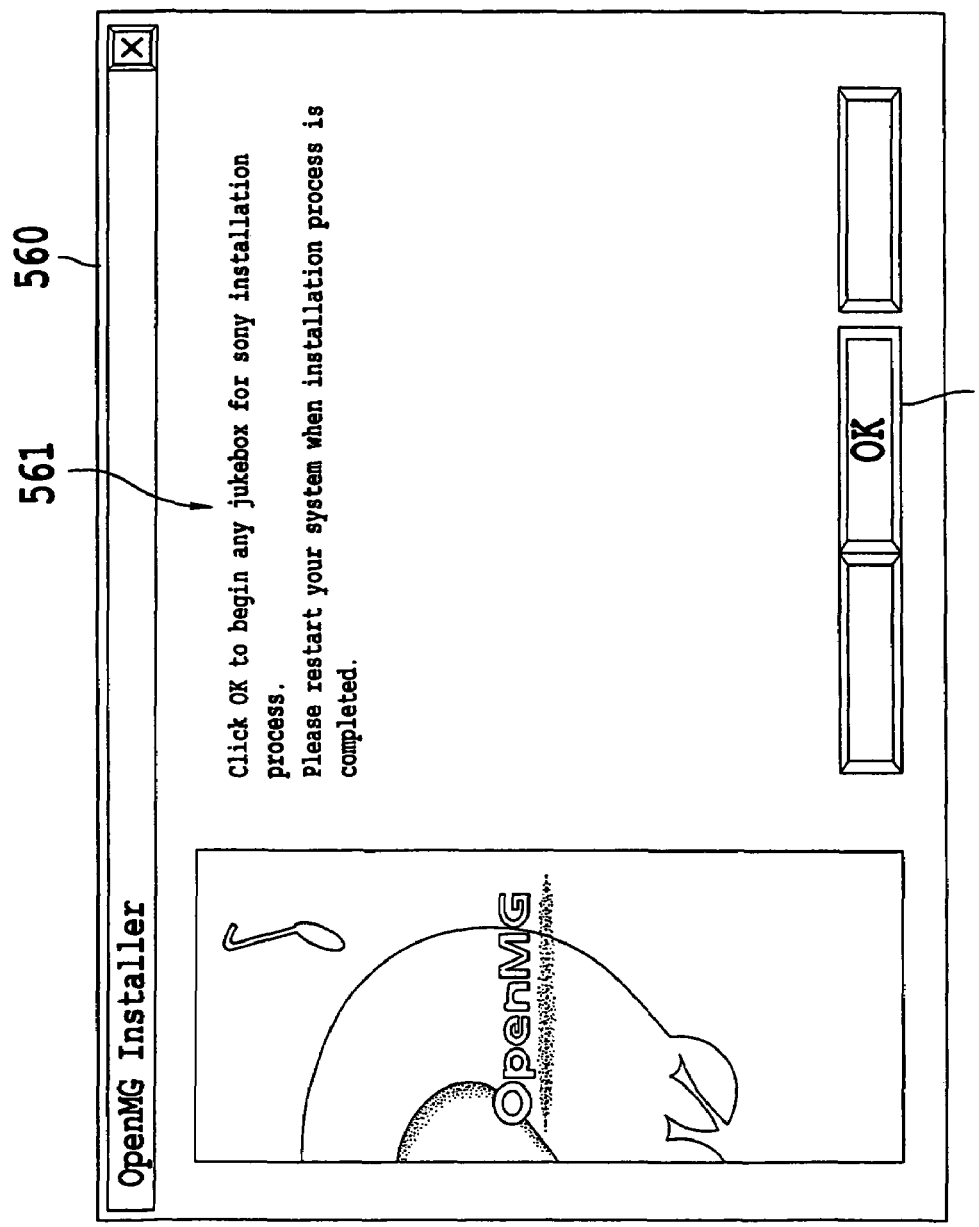
FIG. 25 is a view of a typical installation complete screen.

FIG. 25 is a view of a typical installation complete screen 560. The installation complete screen 560 includes an installation complete message display area 561 and an OK button 562. The installation complete message display area 561 displays two messages: one indicating that the installation process has been normally terminated, the other urging the user to restart the computer 100. The OK button 562 is pushed in order to terminate the processing of the installation support unit 132 and to restart the computer 100. Specifically, pushing the OK button 562 closes the installation complete screen 560 on the display 120 and restarts the computer 100.

The modules constituting the display operation prompting unit 135 may be supplied either by the vendor offering the installation support program in question or by different vendors.

Figure 26:
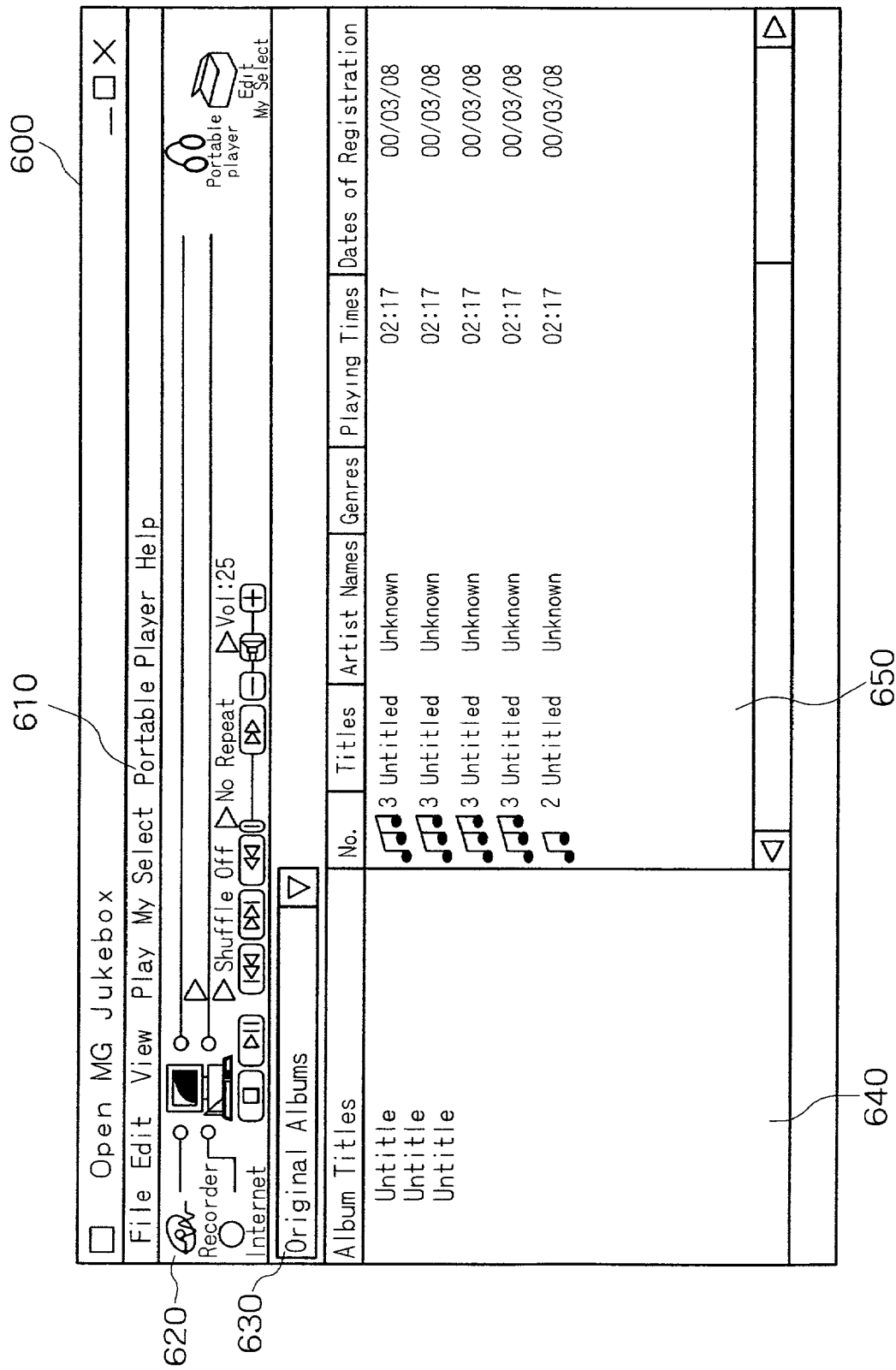
FIG. 26 is a schematic view showing a first example of a display screen given by the display operation prompting unit.

FIG. 26 is a schematic view showing a first example of a display screen given by the display operation prompting unit 135. This is a typical display screen 600 of the display operation prompting unit 135 based on the display operation prompting program provided by the vendor that offers the installation support program.

The screen 600 includes a menu bar 610, a music data operation prompting area 620, an album display selection box 630, an album display area 640, and a music display area 650.

The menu bar 610 has such menu items as "File" and "Edit" for inputting a command. When any one of the menu items is selected by use of the mouse or like means, a pull-down menu containing commands is displayed. The user selects desired commands from the pull-down menu, causing the computer 100 to execute the processes corresponding to the selected commands.

The music data operation prompting area 620 includes various buttons such as one for designating the reproduction of music data. Also included are a button for recording data from CDs and buttons for controlling currently selected music data as desired. The buttons for music data control include a stop button for stopping playback, a play button for starting and temporarily halting playback, a backward feed button for regaining the top of the currently playing piece of music, a forward feed button for reaching the top of the piece of music immediately following the currently playing music, a rewind button for rewinding the currently playing piece of music, and a fast-forward button for fast-forwarding the currently playing piece of music.

The album display selection box 630 permits selection of the title of an album or the kind of music to be displayed. For example, the album display selection box 630 allows the user to select the title or the kind of a desired album or music from such sources as user-edited original albums and "my-select" albums each containing user-selected pieces of music picked up from different albums. It is also possible for the user to specify a search condition in the album display selection box 630 so that only the titles of albums or the kinds of music meeting that condition may be displayed.

The album display area 640 displays a list of albums selected in the album display selection box 630.

The music display area 650 shows the titles of the pieces of music contained in the currently selected album. In the music display area 650, each piece of music is shown furnished with various items of information: the remaining number of times (No.) the music in question can be checked out, title of the music, the name of the performing artist, genre name of the music, playing time, and date of registration.

Figure 27:
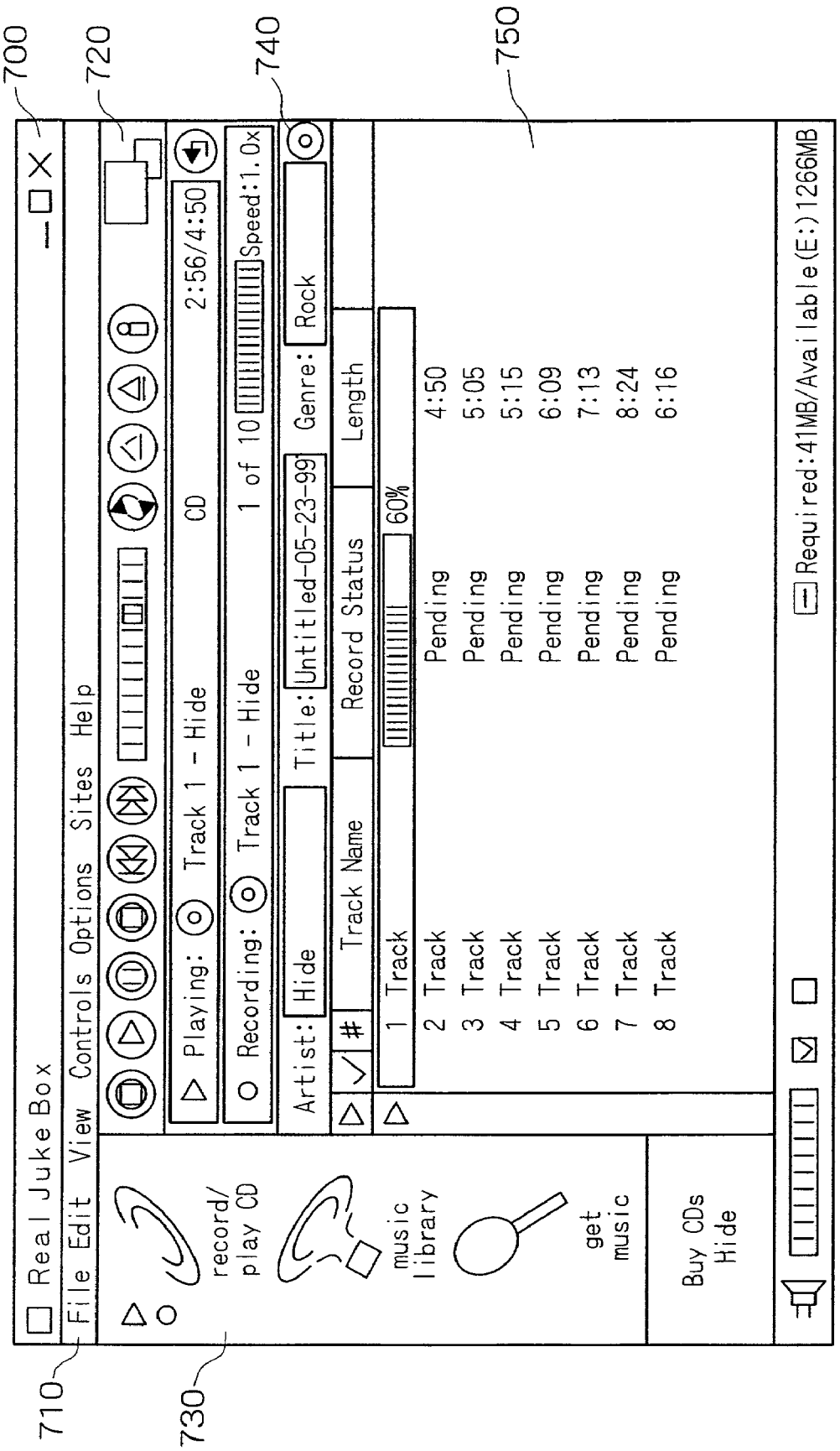
FIG. 27 is a schematic view indicating a second example of the display screen given by the display operation prompting unit.

FIG. 27 is a schematic view indicating a second example of the display screen given by the display operation prompting unit 135. This is a typical display screen 700 of the display operation prompting unit 135 based on the display operation prompting program provided by a vendor other than that which offers the installation support program.

The screen 700 includes a menu bar 710, a music data operation prompting area 720, a music data I/O prompting area 730, an album information display area 740, and a music display area 750.

The menu bar 710 has such menu items as "File" and "Edit." When any one of the menu items is selected by use of the mouse or like means, a pull-down menu containing commands is displayed. The user selects desired commands from the pull-down menu, causing the computer 100 to execute the processes corresponding to the selected commands.

The music data operation prompting area 720 includes various buttons for controlling the currently selected music data as desired. The buttons for music data control include a stop button for stopping playback, a play button for starting and temporarily halting playback, a backward feed button for regaining the top of the currently playing piece of music, and a forward feed button for reaching the top of the piece of music immediately following the currently playing music.

The music data I/O prompting area 730 includes a recording button for recording music data from CDs, a button for displaying an album list, and a button for acquiring music data. When any one of the buttons in the music data I/O prompting area 730 is selected by use of the mouse or like means, the computer 100 carries out the process corresponding to the selected button.

The album information display area 740 displays such items of information as the name of the artist whose album is being selected, the title of the selected album, and the genre of the album.

The music display area 750 indicates the titles of the pieces of music contained in the currently selected album.

As described, the embodiment above of the invention allows the user utilizing the computer 100 to download the installation support program into the computer 100 so that the computer 100 may execute the downloaded program to start up the installation support unit 132. Once the installation support unit 132 is started, the computer 100 can determine whether or not to install a plurality of modules 153. Because the main bodies of the modules 153 have yet to be downloaded when the necessity or the compatibility of the installation is determined, it is possible to avoid downloading unnecessary or incompatible programs.

The above-described embodiment permits acquisition of information about the environment compatible with the types of modules. That is, relevant environment information can be acquired about various kinds of modules such as device drivers and plug-in components.

The embodiment above also allows the installation support program to upgrade itself. When thus upgraded, the installation support program can consistently address the modules of new application types every time they appear on the market.

The above-described embodiment allows the installation support unit 132 and the display operation prompting unit installer 133 to communicate with each other. This makes it possible for the display operation prompting unit installer 133 to start up the installation support unit 132 so that the installation support unit 132 may report the result of its processing to the display operation prompting unit installer 133. That means the vendor that has created the display operation prompting modules may request the installation support unit 132 to install at the same time the modules for the content management unit 134 As a result, creation of the modules constituting the display operation prompting unit installer 133 is made much easier.

If the relevant must-installed flags are set in the setting file, the installer distributed by the vendor that offers the display operation prompting unit program always installs the display operation prompting unit program.

The embodiment above distributes the location file and setting file in encrypted form so that users are unable to know where the program modules are located. The decrypted location file and setting file are placed temporarily in the RAM 113 and then discarded once they have been used; these files are not stored on the hard disk drive 121. That means modules cannot be obtained without recourse to the installation support unit 132. This prevents users from installing at their own discretion any modules that are not allowed to be installed under the licensing agreement in effect or other restrictions in force.

Because the location file defines where the setting file is located, it is possible easily to change the storage location of the setting file. In other words, if the storage location of the setting file has been changed, the location file need only be modified in contents accordingly. Should the encryption of the location file be decrypted somehow, the locations of the modules involved can still be kept concealed by immediately changing the location of the setting file.

The embodiment of the invention has version numbers and sub-version numbers included in the setting file. This makes it possible to install under a specific OS the modules in versions different from those for other OSs. The modules to be downloaded have a plurality of their versions integrated therein, so that each client computer may install the modules in those versions that are compatible with the type or the version of the OS in use.

In the embodiment above, the display operation prompting unit installer 133 alone was shown calling up the installation support unit 132. However, this is not limitative of the invention. Alternatively, other suitable applications (e.g., display operation prompting unit 135) may invoke the installation support unit 132.

A startup object (i.e., argument) may be attached to a startup instruction for calling up the installation support unit 132. The attached object causes the installation support unit 132 to execute a specific type of control. Illustratively, an option "/a" attached to the startup instruction causes the installation support unit 132 to download all downloadable modules. That is, the option checks (i.e., turns on) the check boxes of all modules in the installable module selection screen 530 shown in FIG. 22.

An option "/moreboot" attached to the startup instruction keeps the installation support unit 132 from displaying an installation complete screen (such as one shown in FIG. 25) upon completion of the installation and prevents restarting of the computer 100.

The processing functions described above are implemented by server and client computers. In such cases, server programs describing the processes of the functions implemented by the server computer are provided, together with client programs (such as the installation support program) describing the details of the functions implemented by each client computer. Executing the server programs allows each server computer to implement its processing functions shown performed by the above-described embodiment. Carrying out the client programs permits each client computer to implement its processing functions attributed to the computer 100 in the above-described embodiment.

The server and client programs describing the contents to be processed may be recorded on computer-readable storage media such as magnetic storage devices, optical disks, magneto-optical storage media, and semiconductor memories. The magnetic storage devices include hard disk drives, flexible disks (FD), and magnetic tapes. The optical disks include DVDs, DVD-RAMs, CD-ROMs, and CD-R/RWs. The magneto-optical storage media include MOs (magneto-optical disks).

To distribute the server and client programs typically involves marketing portable storage media such as DVDs and CD-ROMs carrying the programs. It is also possible for the client programs to be stored on a storage device of the server computer so that the programs may be transferred from the server computer to client computers over a network.

The server computer executing the server programs has these programs loaded into its storage device illustratively from a portable storage medium. Thereafter the server computer retrieves the server programs from its storage device and carries out processing in accordance with the programs. Alternatively, the server computer may read the server programs directly from the portable storage medium and execute processing based on the programs thus acquired.

Each client computer performing the client programs has these program loaded into its storage device illustratively from a portable storage medium or from the server computer through program transfer. Thereafter the client computer retrieves the client programs from its storage device to carry out processing in accordance with the retrieved programs. Alternatively, the client computer may read the client programs directly from a portable storage medium and perform processing based on the programs thus obtained. As another alternative, the client computer may execute the process corresponding to each client program whenever the program is transferred from the server computer.

As described and according to the invention, whether or not to install program modules is determined by acquiring environment information relevant to the types of these modules so that only the modules judged compatible with the environment of interest are allowed to be installed. This makes it possible for users to install only necessary program modules without becoming aware of specific conditions restricting the installation of the modules.

While preferred embodiments of the present invention have been described using specific terms, such description is for illustrative purposes only, and it is to be understood that changes and variations may be made without departing from the spirit or scope of the following claims.

What is claimed is:

1. An information processing apparatus comprising:
    location information acquiring means for acquiring, from a predetermined setting server, location information, included in a setting file, defining the location of a module server which stores at least one program module on a computer readable medium;
    installable program module determining means for automatically determining if an installable program module is necessary based on the installable program module information included in the setting file, an operating environment of said information processing apparatus and whether or not said installable program module is later in version than a program module previously installed on the information processing apparatus and corresponding to said installable program module; and
    program module acquiring means for acquiring and installing on said information processing apparatus said installable program module, determined to be necessary by the installable program module determining means, by gaining access to said module server storing said installable program module based on said location information included in the setting file.

2. An information processing apparatus according to claim 1, further comprising:
    module information acquiring means for acquiring, from a predetermined setting server, module information about at least one program module;
    wherein said program module acquiring means acquires said installable program module by gaining access to said module server of which the location is defined by said location information.

3. An information processing apparatus according to claim 2, wherein said installable program module determining means further determines whether or not said installable program module meets requirements for a program module to operate under an operating system of said information processing apparatus.

4. An information processing apparatus according to claim 2, wherein said installable program module determining means utilizes a route through which said program module of which the location is defined by said location information is acquired, as a basis for the determination.

5. An information processing apparatus according to claim 2, wherein said program module acquiring means acquires, from among installable program modules, only a program module allowed to be installed by operation of a user.

6. An information processing apparatus according to claim 1, further comprising location information decryption means for decrypting said location information which is encrypted.

7. An information processing apparatus comprising:
    location file acquiring means for acquiring, from a predetermined location server, a location file defining the location of a setting server which stores a setting file including location information defining the location of a module server storing at least one program module on a computer readable medium;
    setting file acquiring means for acquiring said setting file by gaining access to said setting server of which the location is defined by said location file; and
    program module acquiring means for acquiring and installing on said information processing apparatus said program module by gaining access to said module server storing said program module based on said location information included in said setting file.

8. An information processing apparatus according to claim 7, further comprising:
    installable program module group determining means for determining a group of installable program modules based on program module information included in said setting file and on an operating environment of said information processing apparatus;
    wherein said program module acquiring means acquires an installable program module by gaining access to said module server of which the location is defined by said location information.

9. An information processing method executing on a computer comprising the steps of:
    acquiring, from a predetermined setting server, location information, included in a setting file, defining the location of a module server which stores at least one program module on a computer readable medium;
    analyzing an operating environment of an information processing apparatus into which to install said at least one program module;
    automatically determining if an installable program module is necessary based on the program module information included in the setting file, said operating environment of said information processing apparatus and whether or not said installable program module is later in version than a program module previously installed on the information processing apparatus and corresponding to said installable program module;
    acquiring said installable program module determined to be necessary by the determining by gaining access to said module server storing said installable program module based on said location information included in the setting file; and
    installing on said information processing apparatus the installable program module acquired by the acquiring.

10. An information processing method according to claim 9, further comprising the steps of:
    acquiring module information about at least one program module from a predetermined module server; and
    acquiring said installable program module by gaining access to said module server of which the location is defined by said location information.

11. An information processing method according to claim 10, wherein said installable program module determining step further determines whether or not said installable program module meets requirements for a program module to operate under an operating system of said information processing apparatus.

12. An information processing method according to claim 10, wherein said installable program module determining step utilizes a route through which said program module of which the location is defined by said location information is acquired, as a basis for the determination.

13. An information processing method according to claim 10, wherein said program module acquiring step acquires, from among installable program modules, only a program module allowed to be installed by operation of a user.

14. An information processing method according to claim 9, further comprising the step of decrypting said location information which is encrypted.

15. An information processing method executing on a computer comprising the steps of:
acquiring, from a predetermined location server, a location file defining the location of a setting server which stores a setting file including location information defining the location of a module server storing at least one program module on a computer readable medium;
acquiring said setting file by gaining access to said setting server of which the location is defined by said location file;
analyzing an operating environment of an information processing apparatus into which to install said at least one program module;
automatically determining if an installable program module is necessary based on the program module information included in said setting file, said operating environment of said information processing apparatus and whether or not said installable program module is later in version than a program module previously installed on the information processing apparatus and corresponding to said installable program module;
acquiring said installable program module determined to be necessary by the determining by gaining access to said module server storing said installable program module based on said location information included in the setting file; and
installing on said information processing apparatus the installable program module acquired by the acquiring.

16. An information processing method according to claim 15, further comprising the steps of:
acquiring said installable program module by gaining access to said module server of which the location is defined by said location information.

17. A storage medium which stores on a computer readable medium, in a computer-readable manner, a software installation support program for causing a computer to carry out the steps of:
acquiring, from a predetermined setting server, location information, included in a setting file, defining the location of a module server which stores at least one program module on a computer readable medium;
analyzing an operating environment of an information processing apparatus into which to install said at least one program module;
automatically determining if an installable program module is necessary based on the program module information included in said setting file, said operating environment of said information processing apparatus and whether or not said installable program module is later in version than a program module previously installed on the information processing apparatus and corresponding to said installable program module;
acquiring said installable program module determined to be necessary by the determining by gaining access to said module server storing said installable program module based on said location information included in the setting file; and
installing on said information processing apparatus the installable program module acquired by the acquiring.

18. A storage medium which stores on a computer readable medium, in a computer-readable manner, a software installation support program according to claim 17, the program further causing said computer to carry out the steps of:
acquiring module information about at least one program module from a predetermined module server; and
acquiring said installable program module by gaining access to said server of which the location is defined by said location information.

19. A storage medium which stores on a computer readable medium, in a computer-readable manner, a software installation support program for causing a computer to carry out the steps of:
acquiring, from a predetermined location server, a location file defining the location of a setting server which stores a setting file including location information defining the location of a module server storing at least one program module on a computer readable medium;
acquiring said setting file by gaining access to said setting server of which the location is defined by said location file;
analyzing an operating environment of an information processing apparatus into which to install said at least one program module;
automatically determining if an installable program module is necessary based on the program module information included in said setting file, said operating environment of said information processing apparatus and whether or not said installable program module is later in version than a program module previously installed on the information processing apparatus and corresponding to said installable program module;
acquiring said installable program module determined to be necessary by the determining by gaining access to said module server storing said installable program module based on said location information included in the setting file; and
installing on said information processing apparatus the installable program module acquired by the acquiring.

20. A storage medium which stores on a computer readable medium, in a computer-readable manner, a software installation support program according to claim 19, the program further causing said computer to carry out the steps of:
acquiring said installable program module by gaining access to said module server of which the location is defined by said location information.

21. An information processing apparatus comprising:
location information acquiring means for acquiring, from a predetermined setting server, location information, included in a setting file, defining the location of module servers which severally store at least one program module on a computer readable medium;
location file acquiring means for acquiring, from a predetermined location server, a location file defining the location of a setting server which stores the setting file including location information defining the location of module servers which severally store at least one program module on a computer readable medium;

setting file acquiring means for acquiring said setting file by gaining access to said setting server of which the location is defined by said location file;

installable program module determining means for automatically determining if an installable program module is necessary based on the installable module information included in said setting file, an operating environment of said information processing apparatus and whether or not said installable program module is later in version than a program module previously installed on the information processing apparatus and corresponding to said installable program module; and program module acquiring means for acquiring and installing on said information processing apparatus said installable program modules determined to be necessary by the installable program module determining means by gaining access to said module servers severally storing said installable program modules based on said location information included in the setting file.

22. An information processing apparatus according to claim 21 comprising:

program module acquiring means for acquiring said program modules by gaining access to said module servers storing said program modules based on said location information.

23. An information processing apparatus comprising:

location information acquiring unit configured to request and receive from a predetermined setting server, location information, included in a setting file, defining the location of a module server which stores at least one program module on a computer readable medium;

installable program module determining unit configured to automatically determine if an installable program module is necessary based on the installable program module information included in the setting file, an operating environment of said information processing apparatus and whether or not said installable program module is later in version than a program module previously installed on the information processing apparatus and corresponding to said installable program module; and program module acquiring unit configured to acquire and install on said information processing apparatus said installable program module, determined to be necessary by the installable program module determining means, by gaining access to said module server storing said installable program module based on said location information included in the setting file.

* * * * *